United States Patent
Arai

(10) Patent No.: US 10,288,857 B2
(45) Date of Patent: May 14, 2019

(54) ZOOM LENS, OPTICAL APPARATUS AND MANUFACTURING METHOD FOR THE ZOOM LENS

(71) Applicant: NIKON CORPORATION, Chiyoda-ku, Tokyo (JP)

(72) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/952,945

(22) Filed: Nov. 26, 2015

(65) Prior Publication Data

US 2016/0154220 A1 Jun. 2, 2016

Related U.S. Application Data

(63) Continuation of application No. PCT/JP2014/002783, filed on May 27, 2014.

(30) Foreign Application Priority Data

May 29, 2013 (JP) ................................. 2013-113151
May 29, 2013 (JP) ................................. 2013-113152

(51) Int. Cl.
| | |
|---|---|
| G02B 15/14 | (2006.01) |
| G02B 15/16 | (2006.01) |
| G02B 15/177 | (2006.01) |
| G02B 13/00 | (2006.01) |
| G02B 13/04 | (2006.01) |

(Continued)

(52) U.S. Cl.
CPC ......... *G02B 15/161* (2013.01); *G02B 13/009* (2013.01); *G02B 15/177* (2013.01); *G02B 5/005* (2013.01); *G02B 13/04* (2013.01); *G02B 15/14* (2013.01); *G02B 27/646* (2013.01)

(58) Field of Classification Search
CPC .... G02B 15/177; G02B 13/009; G02B 15/14; G02B 15/161; G02B 13/04; G02B 5/005
USPC ....... 359/680, 682–685, 691, 717, 740, 753, 359/793
See application file for complete search history.

(56) References Cited

U.S. PATENT DOCUMENTS

| | | | |
|---|---|---|---|
| 4,999,007 A | 3/1991 | Aoki et al. | |
| 7,002,755 B2 | 2/2006 | Mihara et al. | |

(Continued)

FOREIGN PATENT DOCUMENTS

| | | | |
|---|---|---|---|
| JP | 1-210914 A | 8/1989 | |
| JP | 8-320435 A | 12/1996 | |

(Continued)

OTHER PUBLICATIONS

International Search Report from International Patent Application No. PCT/JP2014/002783, dated Jul. 29, 2014.

(Continued)

*Primary Examiner* — Evelyn A Lester
(74) *Attorney, Agent, or Firm* — Shapiro, Garber and Rosenberger, PLLC

(57) ABSTRACT

Provided is a zoom lens (ZL) which includes, in order from an object, a first lens group (G1) having negative refractive power, and a second lens group (G2) having positive refractive power, and which satisfies the following conditional expression (1):

$$1.90 < ft/Gf2 < 3.50 \qquad (1),$$

where ft denotes a focal length of the zoom lens (ZL) in the telephoto end state, and Gf2 denotes a focal length of the second lens group (G2).

20 Claims, 19 Drawing Sheets

(51) Int. Cl.
*G02B 5/00* (2006.01)
*G02B 27/64* (2006.01)

(56) References Cited

U.S. PATENT DOCUMENTS

| | | | |
|---|---|---|---|
| 7,212,242 | B2 | 5/2007 | Watanabe et al. |
| 7,289,152 | B2 | 10/2007 | Watanabe et al. |
| 7,339,744 | B2 | 3/2008 | Hankawa et al. |
| 7,420,611 | B2 | 9/2008 | Watanabe et al. |
| 8,023,199 | B2 | 9/2011 | Katakura |
| 8,208,205 | B2 | 6/2012 | Tashiro |
| 8,390,938 | B2 | 3/2013 | Katakura |
| 8,395,850 | B2 | 3/2013 | Tashiro |
| 8,582,211 | B2 | 11/2013 | Katakura |
| 2003/0103157 | A1 | 6/2003 | Watanabe et al. |
| 2003/0210471 | A1 | 11/2003 | Mihara et al. |
| 2004/0080655 | A1 | 4/2004 | Watanabe et al. |
| 2006/0170815 | A1 | 8/2006 | Watanabe et al. |
| 2006/0221212 | A1 | 10/2006 | Hankawa et al. |
| 2006/0274168 | A1 | 12/2006 | Watanabe et al. |
| 2006/0274169 | A1 | 12/2006 | Watanabe et al. |
| 2007/0070518 | A1 | 3/2007 | Muratani et al. |
| 2008/0198463 | A1 | 8/2008 | Muratani |
| 2008/0291297 | A1 | 11/2008 | Watanabe et al. |
| 2009/0296233 | A1 | 12/2009 | Tashiro |
| 2010/0091381 | A1 | 4/2010 | Katakura |
| 2010/0284093 | A1* | 11/2010 | Tashiro ............ G02B 15/177 359/691 |
| 2011/0222165 | A1 | 9/2011 | Tashiro |
| 2012/0008215 | A1 | 1/2012 | Katakura |
| 2012/0147480 | A1* | 6/2012 | Fujisaki ............ G02B 15/177 359/691 |
| 2012/0229903 | A1* | 9/2012 | Matsumura ........ G02B 27/646 359/686 |
| 2012/0229915 | A1 | 9/2012 | Tashiro |
| 2012/0300113 | A1* | 11/2012 | Okubo ............ G02B 15/177 359/680 |
| 2013/0077179 | A1* | 3/2013 | Luo ............ G02B 15/177 359/689 |
| 2013/0242164 | A1 | 9/2013 | Katakura |
| 2014/0347523 | A1 | 11/2014 | Kuwashiro |

FOREIGN PATENT DOCUMENTS

| | | |
|---|---|---|
| JP | 2002-365545 A | 12/2002 |
| JP | 2004-053633 A | 2/2004 |
| JP | 2004-102211 A | 4/2004 |
| JP | 2005-316182 A | 11/2005 |
| JP | 2006-284790 A | 10/2006 |
| JP | 2007-093972 A | 4/2007 |
| JP | 2007-293368 A | 11/2007 |
| JP | 2008-139837 A | 6/2008 |
| JP | 2008-203344 A | 9/2008 |
| JP | 2008-203871 A | 9/2008 |
| JP | 2009-80501 A | 4/2009 |
| JP | 2009-151319 A | 7/2009 |
| JP | 2009-294303 A | 12/2009 |
| JP | 2010-091948 A | 4/2010 |
| JP | 2010-224580 A | 10/2010 |
| JP | 2010-286810 A | 12/2010 |
| JP | 2010-286819 A | 12/2010 |
| JP | 2012-185345 A | 9/2012 |
| JP | 2014-228733 A | 12/2014 |

OTHER PUBLICATIONS

Office Action dated Dec. 27, 2016, in Japanese Patent Application No. 2013-113151.
Office Action dated Dec. 27, 2016, in Japanese Patent Application No. 2013-113152.
First Office Action dated Mar. 1, 2017, in Chinese Patent Application No. 201480031073.5.
Second Office Action dated Apr. 16, 2018, in Chinese Patent Application No. 201480031073.5.
International Preliminary Report on Patentability from Patent Application No. PCT/JP2014/002783, dated Dec. 10, 2015.

* cited by examiner

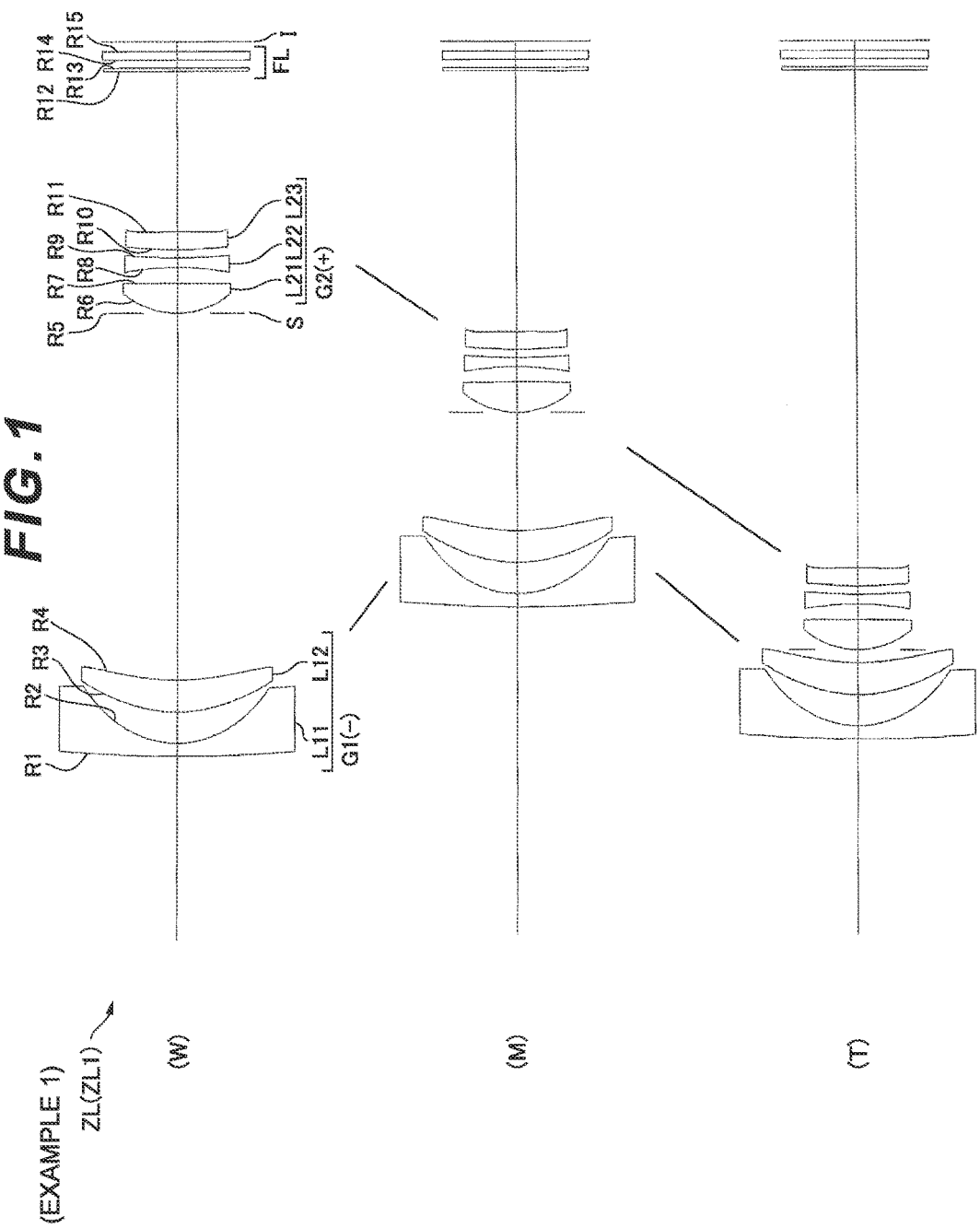

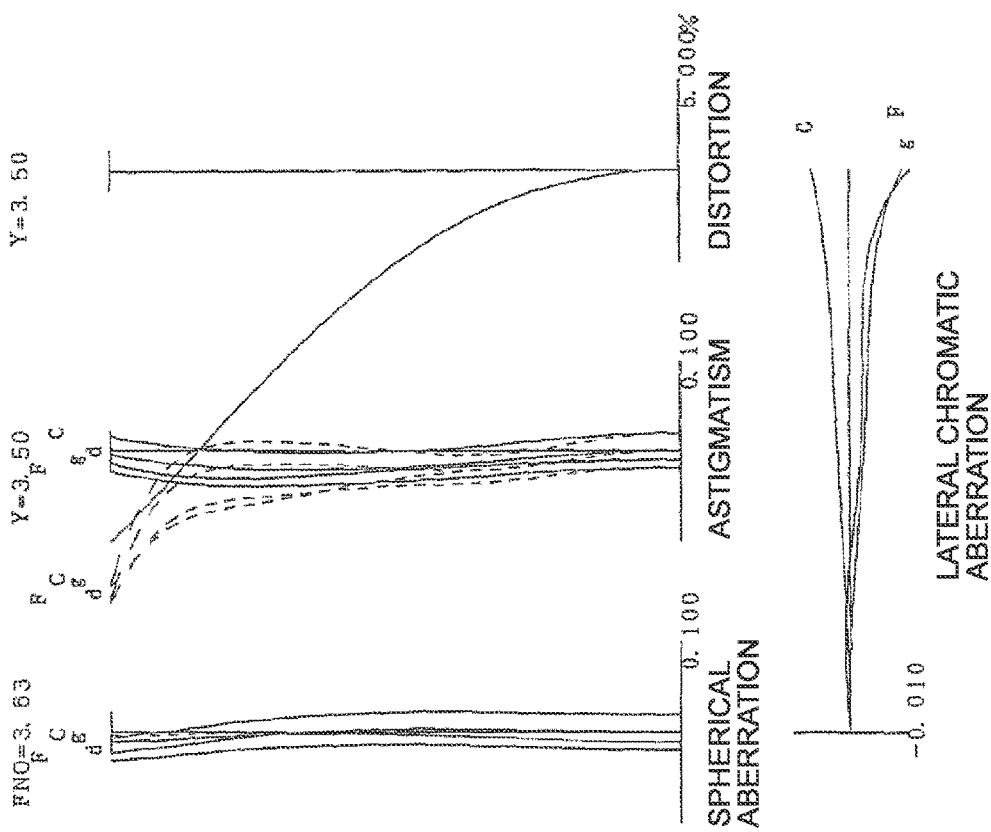

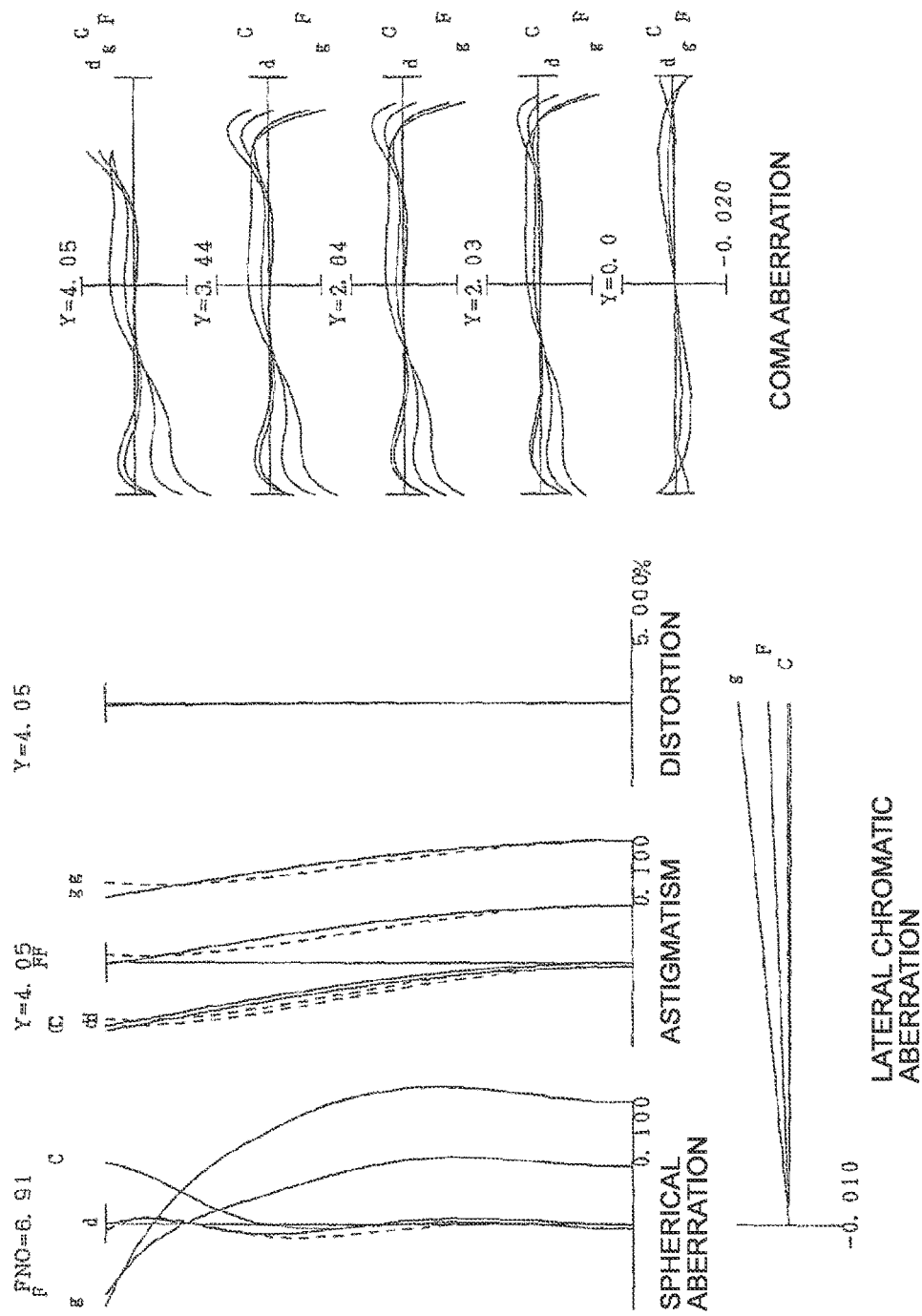

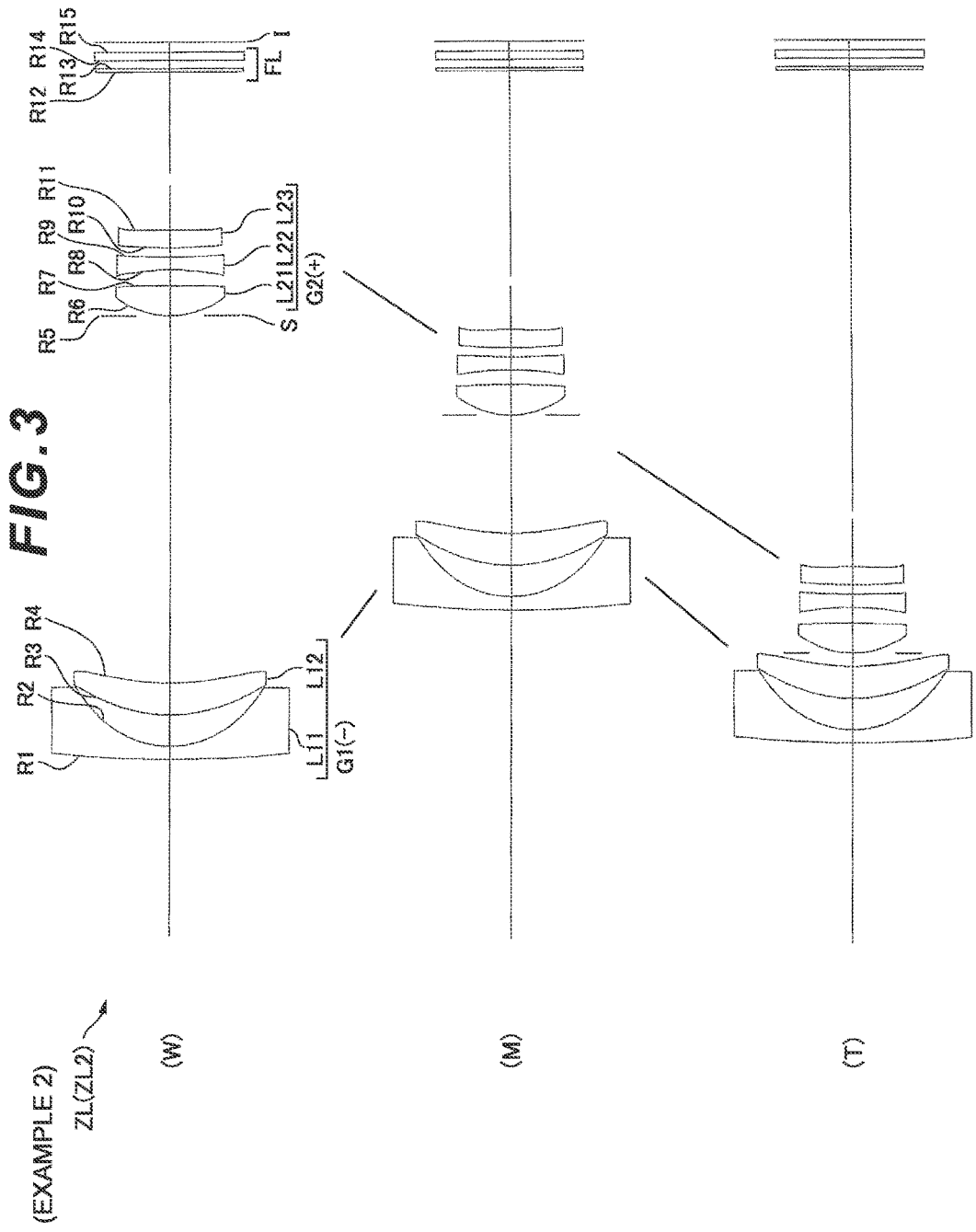

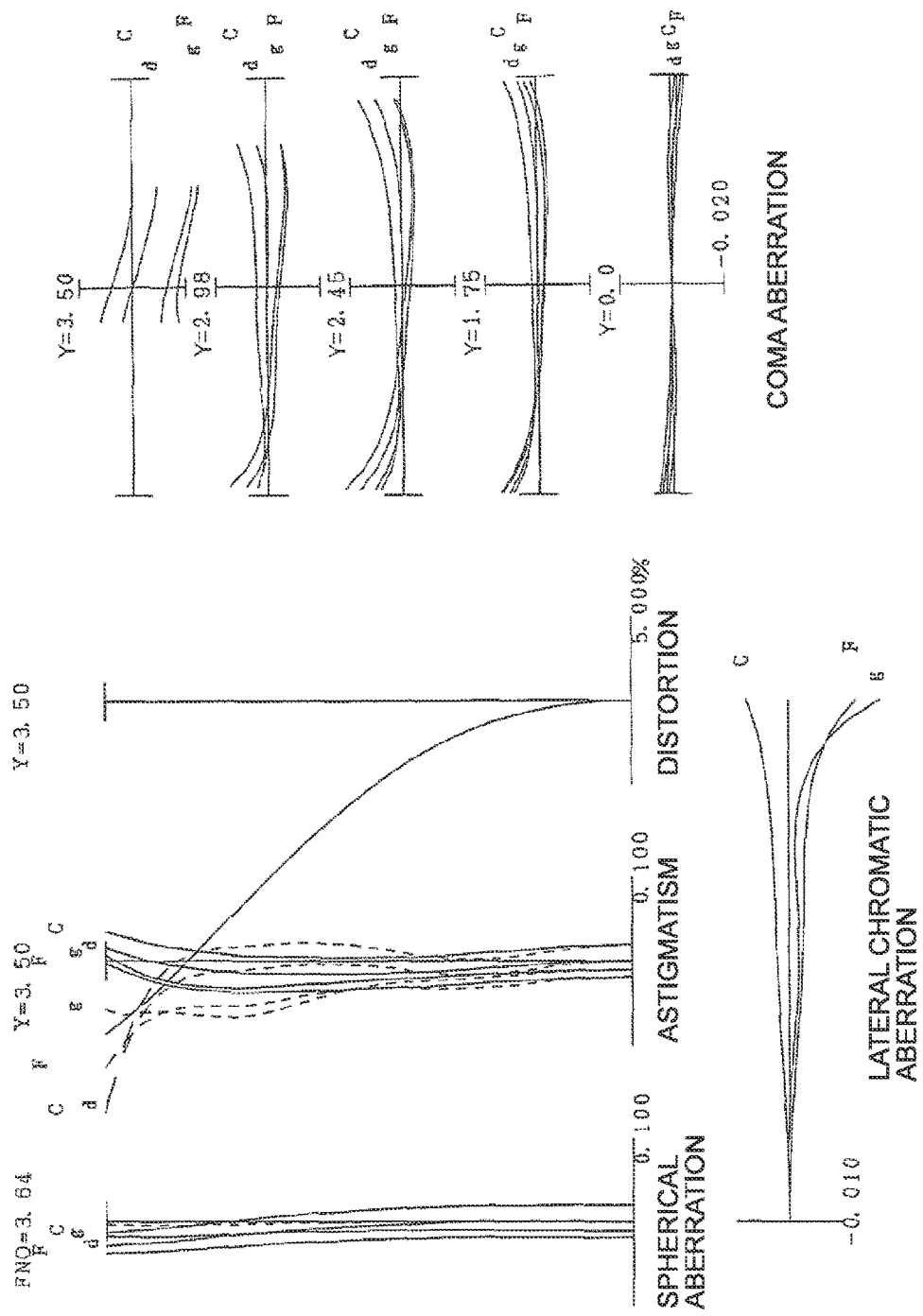

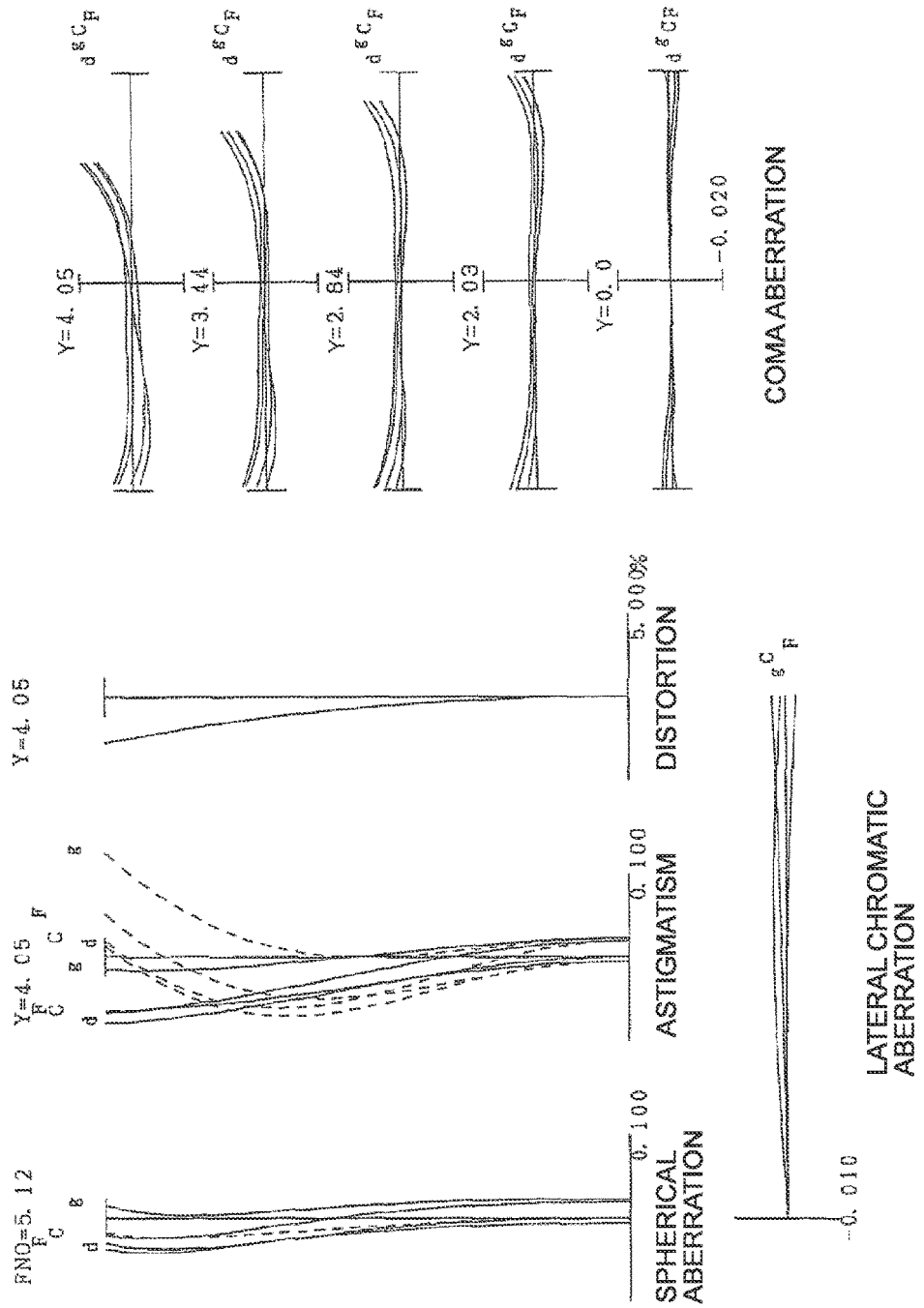

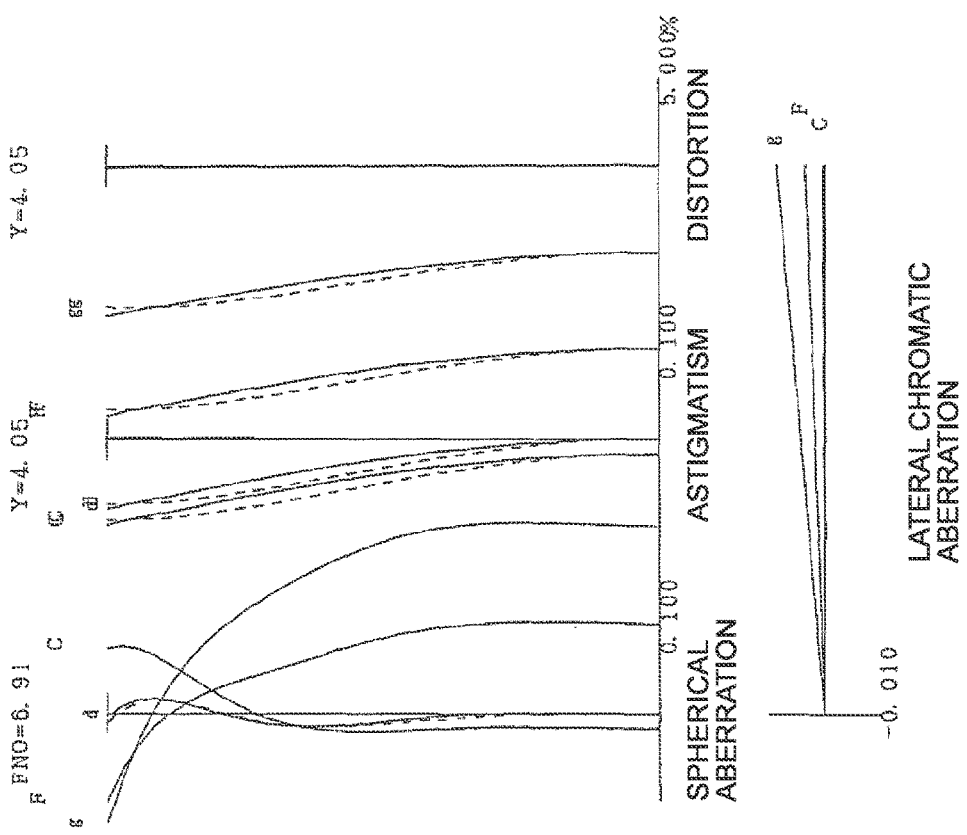

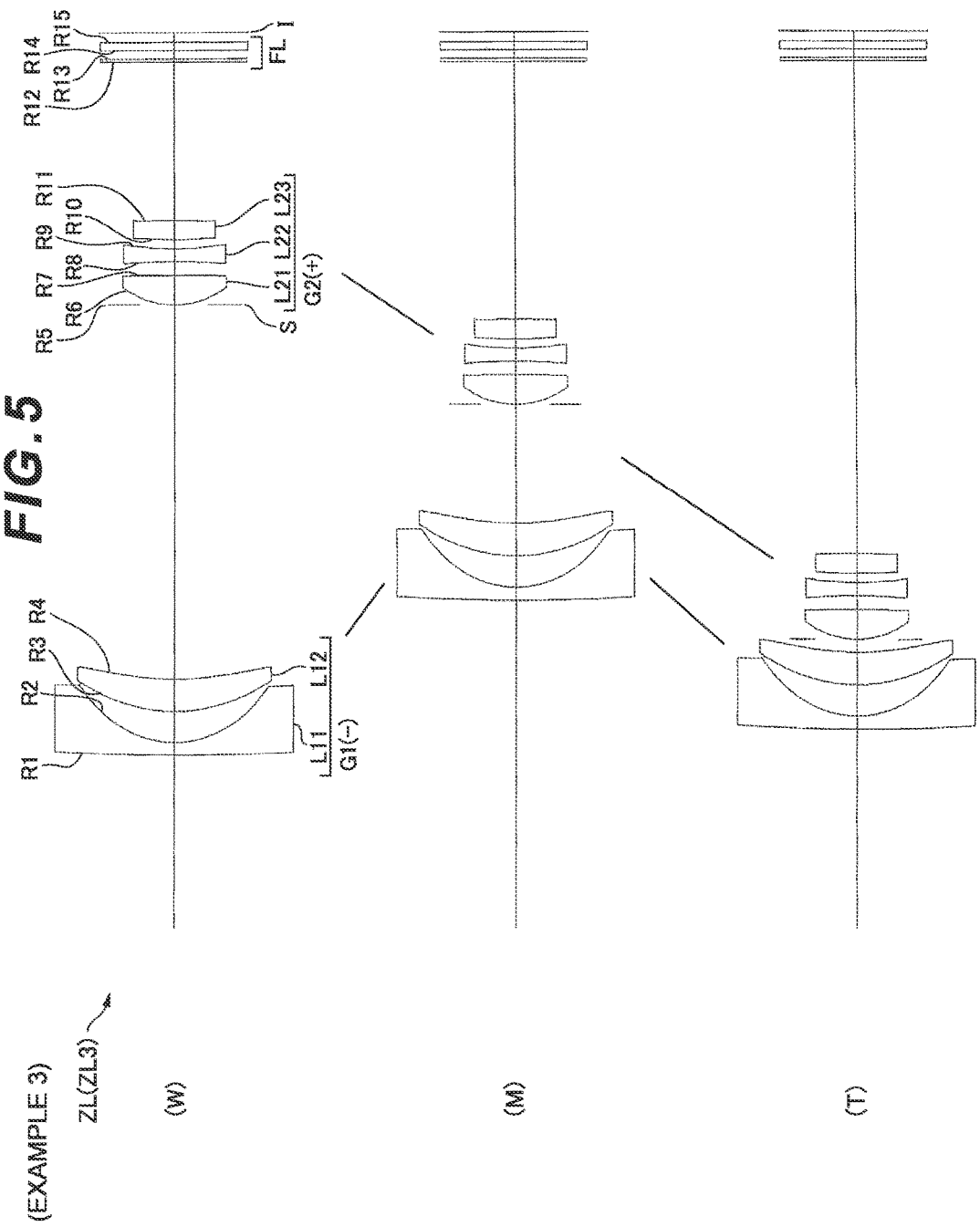

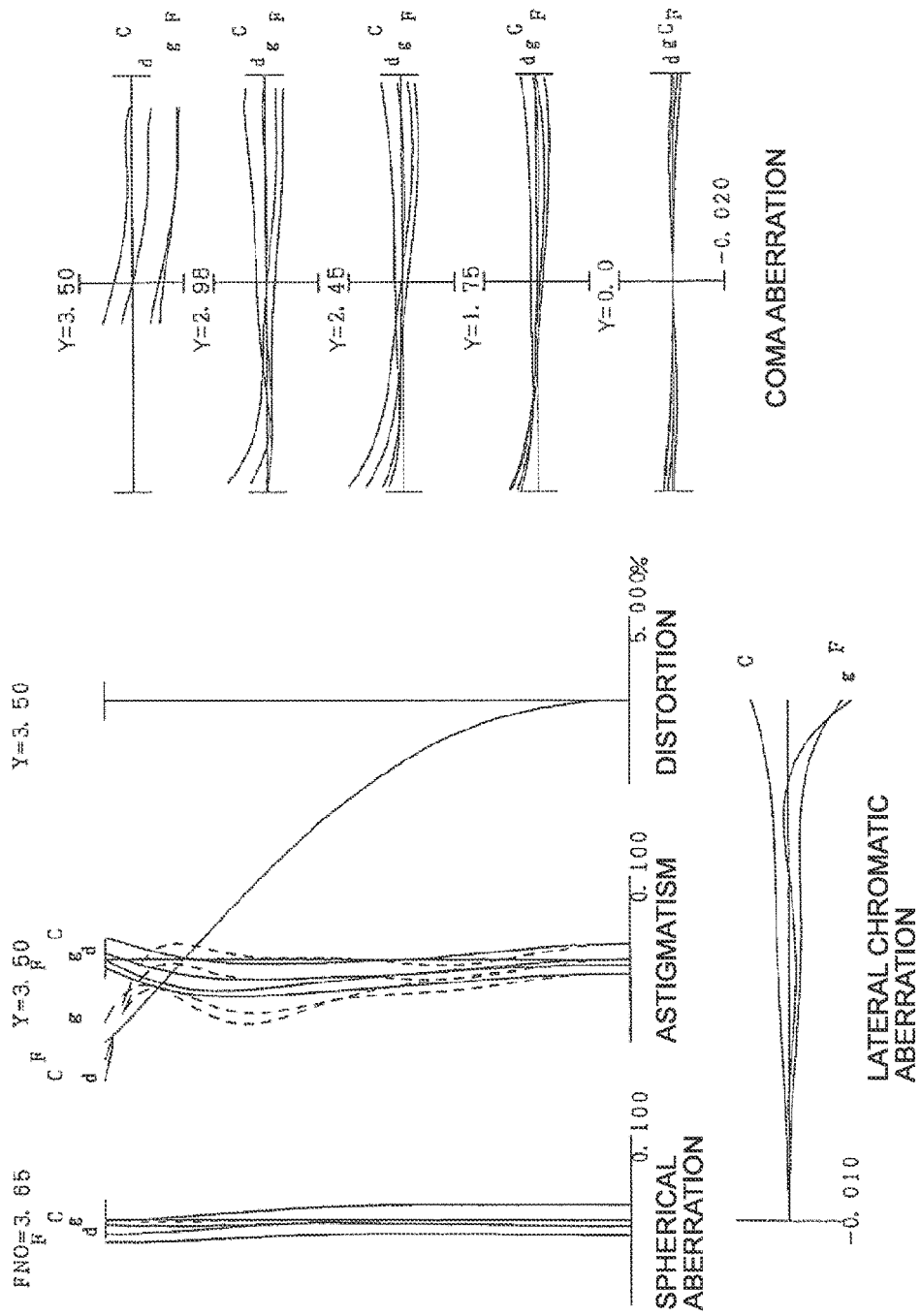

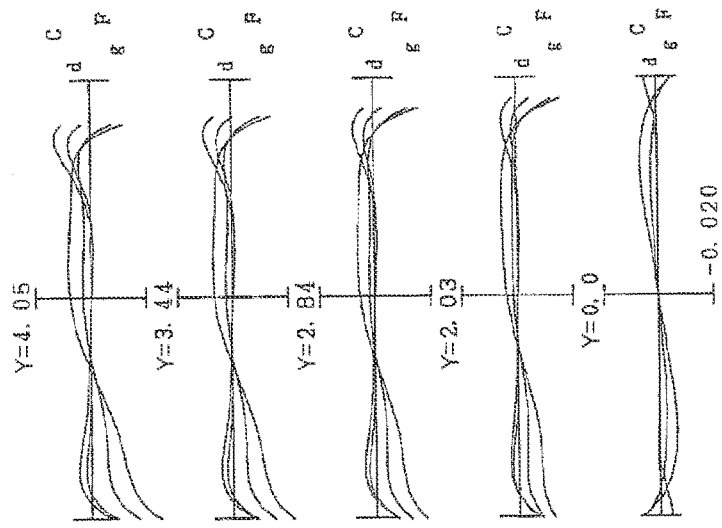
FIG. 6C
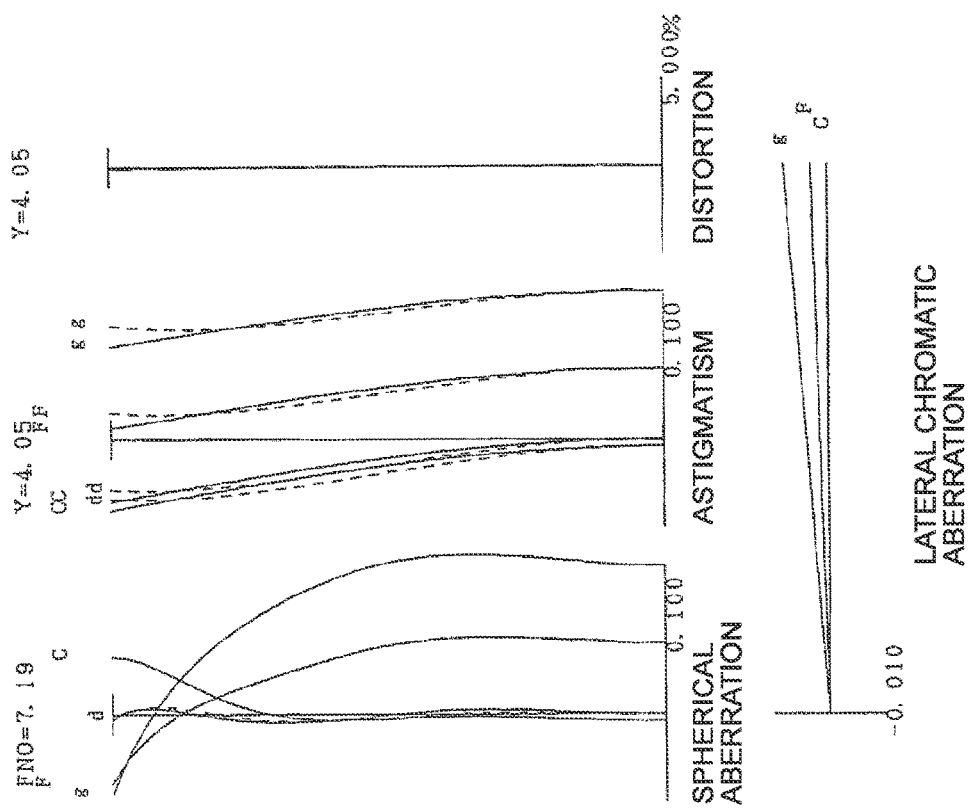

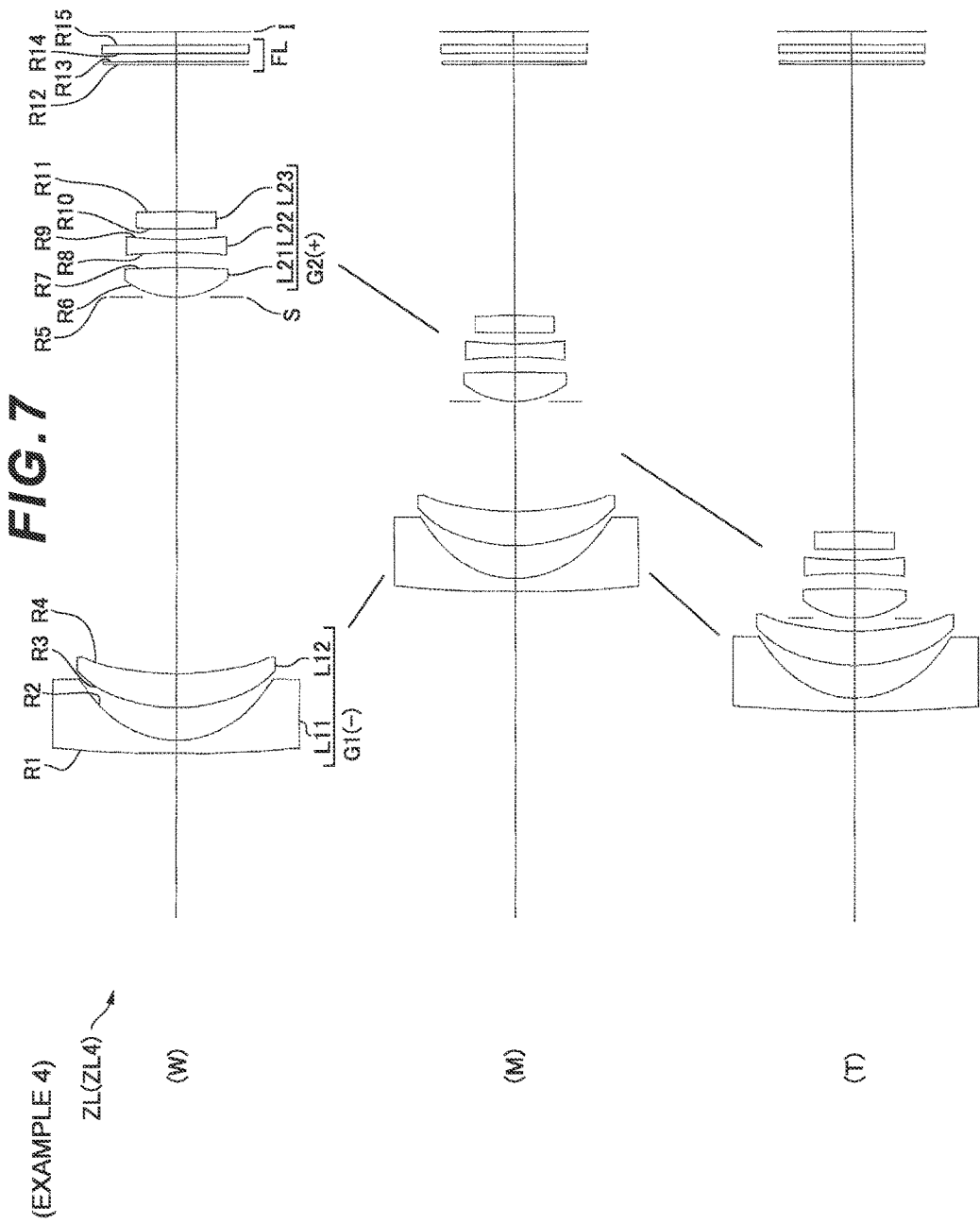

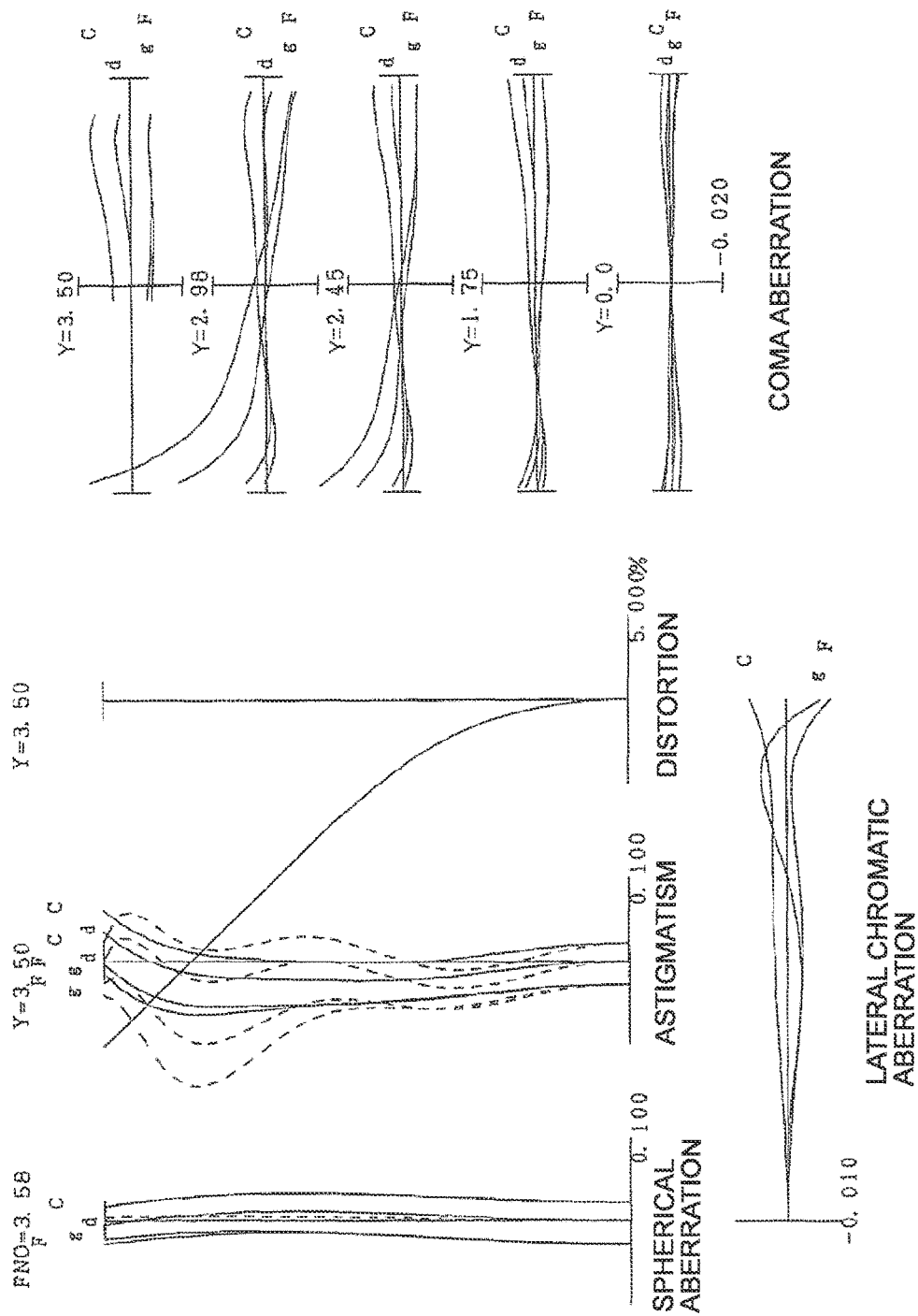

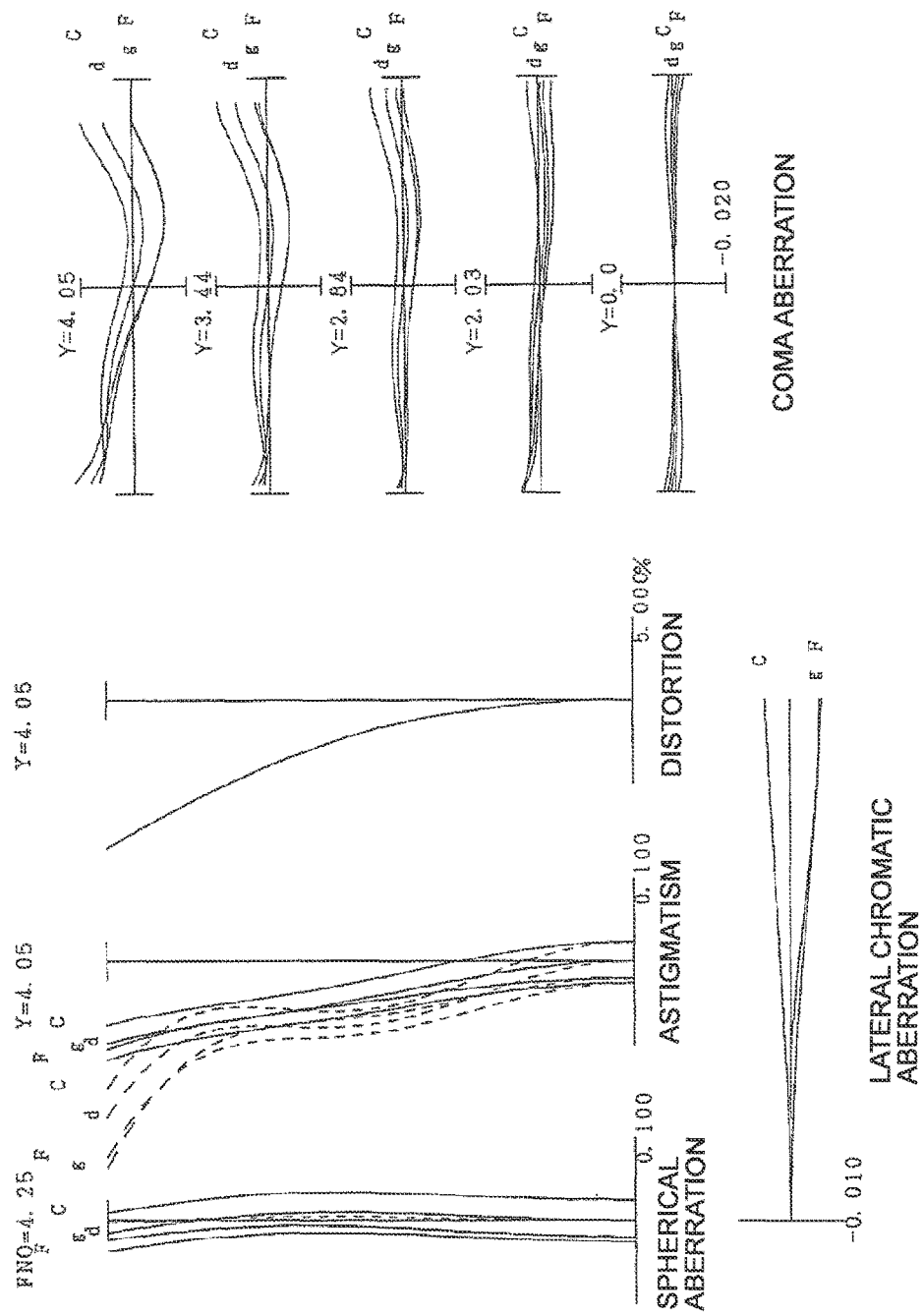

ZOOM LENS, OPTICAL APPARATUS AND MANUFACTURING METHOD FOR THE ZOOM LENS

RELATED APPLICATIONS

This is a continuation of PCT International Application No. PCT/JP2014/002783, filed on May 27, 2014, which is hereby incorporated by reference. This application also claims the benefit of Japanese Patent Application Nos. 2013-113151 and 2013-113152, filed in Japan on May 29, 2013, which are hereby incorporated by reference.

TECHNICAL FIELD

The present invention relates to a zoom lens, an optical apparatus and a manufacturing method for the zoom lens.

TECHNICAL BACKGROUND

Compact and high performance zoom lenses have been proposed as image capturing lenses of video cameras, electronic still cameras and the like (e.g. see Patent Document 1).

PRIOR ARTS LIST

Patent Document

Patent Document 1: Japanese Laid-Open Patent Publication No. 2010-286819

SUMMARY OF THE INVENTION

Problems to be Solved by the Invention

In a zoom lense however, higher magnification and wider angle of view are demanded.

With the foregoing in view, it is an object of the present invention to provide a zoom lens and an optical apparatus which are suitable for video cameras, electronic still cameras and the like using solid-state image sensors or the like, and have a high zoom ratio, a wide angle of view, compactness and ultra high image quality, and a manufacturing method for the zoom lens.

Means to Solve the Problems

To achieve this object, a zoom lens according to the present invention includes, in order from an object:
a first lens group having negative refractive power; and a second lens group having positive refractive power, and satisfies the following conditional expression.

$$1.90 < ft/Gf2 < 3.50$$

where ft denotes a focal length of the zoom lens in a telephoto end state, and Gf2 denotes a focal length of the second lens group.

It is preferable that the zoom lens according to the present invention satisfies the following conditional expression.

$$1.85 < N1AV$$

where N1AV denotes an average value of refractive indexes at d-line of optical materials of lenses constituting the first lens group.

It is preferable that the zoom lens according to the present invention satisfies the following conditional expression.

$$1.50 < N2AV < 1.80$$

where N2AV denotes an average value of refractive indexes at d-line of optical materials of lenses constituting the second lens group.

It is preferable that the zoom lens according to the present invention satisfies the following conditional expression.

$$0.10 < fw/Gf2 < 0.55$$

where fw denotes a focal length of the zoom lens in a wide-angle end state, and Gf2 denotes a focal length of the second lens group.

In the zoom lens according to the present invention, it is preferable that the first lens group is constituted only by, in order from the object, a negative lens and a positive lens.

In the zoom lens according to the present invention, it is preferable that the second lens group is constituted by at least one positive lens and at least one negative lens.

In the zoom lens according to the present invention, it is preferable that the second lens group is constituted only by, in order from the object, a positive lens, a negative lens and a positive lens.

In the zoom lens according to the present invention, it is preferable that respective lenses constituting the second lens group are disposed via air.

In the zoom lens according to the present invention, it is preferable that the distance between the first lens group and the second lens group changes upon zooming from the wide-angle end state to the telephoto end state.

In the zoom lens according to the present invention, it is preferable that, upon zooming from the wide-angle end state to the telephoto end state, the first lens group moves along a path having convex curve toward the image, and the second lens group moves toward the object.

An optical apparatus according to the present invention includes any one of the above zoom lenses.

A zoom lens according to the present invention includes, in order from an object: a first lens group having negative refractive power; and a second lens group having positive refractive power, and satisfies the following conditional expression.

$$0.10 < fw/Gf2 < 0.55$$

where fw denotes a focal length of the zoom lens in a wide-angle end state, and Gf2 denotes a focal length of the second lens group.

It is preferable that the zoom lens according to the present invention satisfies the following conditional expression.

$$1.85 < N1AV$$

where N1AV denotes an average value of refractive indexes at d-line of optical materials of lenses constituting the first lens group.

It is preferable that the zoom lens according to the present invention satisfies the following conditional expression.

$$1.50 < N2AV < 1.80$$

where N2AV denotes an average value of refractive indexes at d-line of optical materials of lenses constituting the second lens group.

An optical apparatus according to the present invention includes any one of the above zoom lenses.

A manufacturing method for a zoom lens according to the present invention is a manufacturing method for a zoom lens including, in order from an object, a first lens group having negative refractive power, and a second lens group having positive refractive power, the method including assembling each lens in a lens barrel so that the following conditional expression is satisfied.

$$1.90 < ft/Gf2 < 3.50$$

where ft denotes a focal length of the zoom lens in a telephoto end state, and Gf2 denotes a focal length of the second lens group.

In the manufacturing method for a zoom lens according to the present invention, it is preferable that the following conditional expression is satisfied.

$$1.85 < N1AV$$

where N1AV denotes an average value of refractive indexes at d-line of optical materials of lenses constituting the first lens group.

In the manufacturing method for a zoom lens according to the present invention, it is preferable that the following conditional expression is satisfied.

$$1.50 < N2AV < 1.80$$

where N2AV denotes an average value of refractive indexes at d-line of optical materials of lenses constituting the second lens group.

In the manufacturing method for a zoom lens according to the present invention, it is preferable that the following conditional expression is satisfied.

$$0.10 < fw/Gf2 < 0.55$$

where fw denotes a focal length of the zoom lens in a wide-angle end state, and Gf2 denotes a focal length of the second lens group.

A manufacturing method for a zoom lens according to the present invention is a manufacturing method for a zoom lens including, in order from an object, a first lens group having negative refractive power, and a second lens group having positive refractive power, the method including assembling each lens in a lens barrel so that the following conditional expression is satisfied.

$$0.10 < fw/Gf2 < 0.55$$

where fw denotes a focal length of the zoom lens in a wide-angle end state, and Gf2 denotes a focal length of the second lens group.

In the manufacturing method for a zoom lens according to the present invention, it is preferable that the following conditional expression is satisfied.

$$1.85 < N1AV$$

where N1AV denotes an average value of refractive indexes at d-line of optical materials of lenses constituting the first lens group.

In the manufacturing method for a zoom lens according to the present invention, it is preferable that the following conditional expression is satisfied.

$$1.50 < N2AV < 1.80$$

where N2AV denotes an average value of refractive indexes at d-line of optical materials of lenses constituting the second lens group.

Advantageous Effects of the Invention

According to the present invention, a zoom lens and an optical apparatus which are suitable for video cameras, electronic still cameras and the like using solid-state image sensors or the like, and have a high zoom ratio, a wide angle of view, compactness, and ultra high image quality, and a manufacturing method for the zoom lens can be provided.

BRIEF DESCRIPTION OF THE DRAWINGS

FIG. 1 shows a configuration and a zooming locus of a zoom lens according to Example 1, where (W) indicates a wide-angle end state, (M) indicates an intermediate focal length state, and (T) indicates a telephoto end state;

FIGS. 2A to 2C show graphs of various aberrations of the zoom lens according to Example 1, where FIG. 2A shows graphs of various aberrations of the zoom lens upon focusing on infinity in the wide-angle end state, FIG. 2B shows graphs of various aberrations of the zoom lens upon focusing on infinity in the intermediate focal length state, and FIG. 2C shows graphs of various aberrations of the zoom lens upon focusing on infinity in the telephoto end state;

FIG. 3 shows a configuration and a zooming locus of a zoom lens according to Example 2, where (W) indicates a wide-angle end state, (M) indicates an intermediate focal length state, and (T) indicates a telephoto end state;

FIGS. 4A to 4C show graphs of various aberrations of the zoom lens according to Example 2, where FIG. 4A shows graphs of various aberrations of the zoom lens upon focusing on infinity in the wide-angle end state, FIG. 4B shows graphs of various aberrations of the zoom lens upon focusing on infinity in the intermediate focal length state, and FIG. 4C shows graphs of various aberrations of the zoom lens upon focusing on infinity in the telephoto end state;

FIG. 5 shows a configuration and a zooming locus of a zoom lens according to Example 3, where (W) indicates a wide-angle end state, (M) indicates an intermediate focal length state, and (T) indicates a telephoto end state;

FIGS. 6A to 6C show graphs of various aberrations of the zoom lens according to Example 3, where FIG. 6A shows graphs of various aberrations of the zoom lens upon focusing on infinity in the wide-angle end state, FIG. 6B shows graphs of various aberrations of the zoom lens upon focusing on infinity in the intermediate focal length state, and FIG. 6C shows graphs of various aberrations of the zoom lens upon focusing on infinity in the telephoto end state;

FIG. 7 shows a configuration and a zooming locus of a zoom lens according to Example 4, where (W) indicates a wide-angle end state, (M) indicates an intermediate focal length state, and (T) indicates a telephoto end state;

FIGS. 8A to 8C show graphs of various aberrations of the zoom lens according to Example 4, where FIG. 8A shows graphs of various aberrations of the zoom lens upon focusing on infinity in the wide-angle end state, FIG. 8B shows graphs of various aberrations of the zoom lens upon focusing on infinity in the intermediate focal length state, and FIG. 8C shows graphs of various aberrations of the zoom lens upon focusing on infinity in the telephoto end state;

FIG. 9A is a front view and FIG. 9B is a rear view;

DESCRIPTION OF THE EMBODIMENTS

Figure 2B:
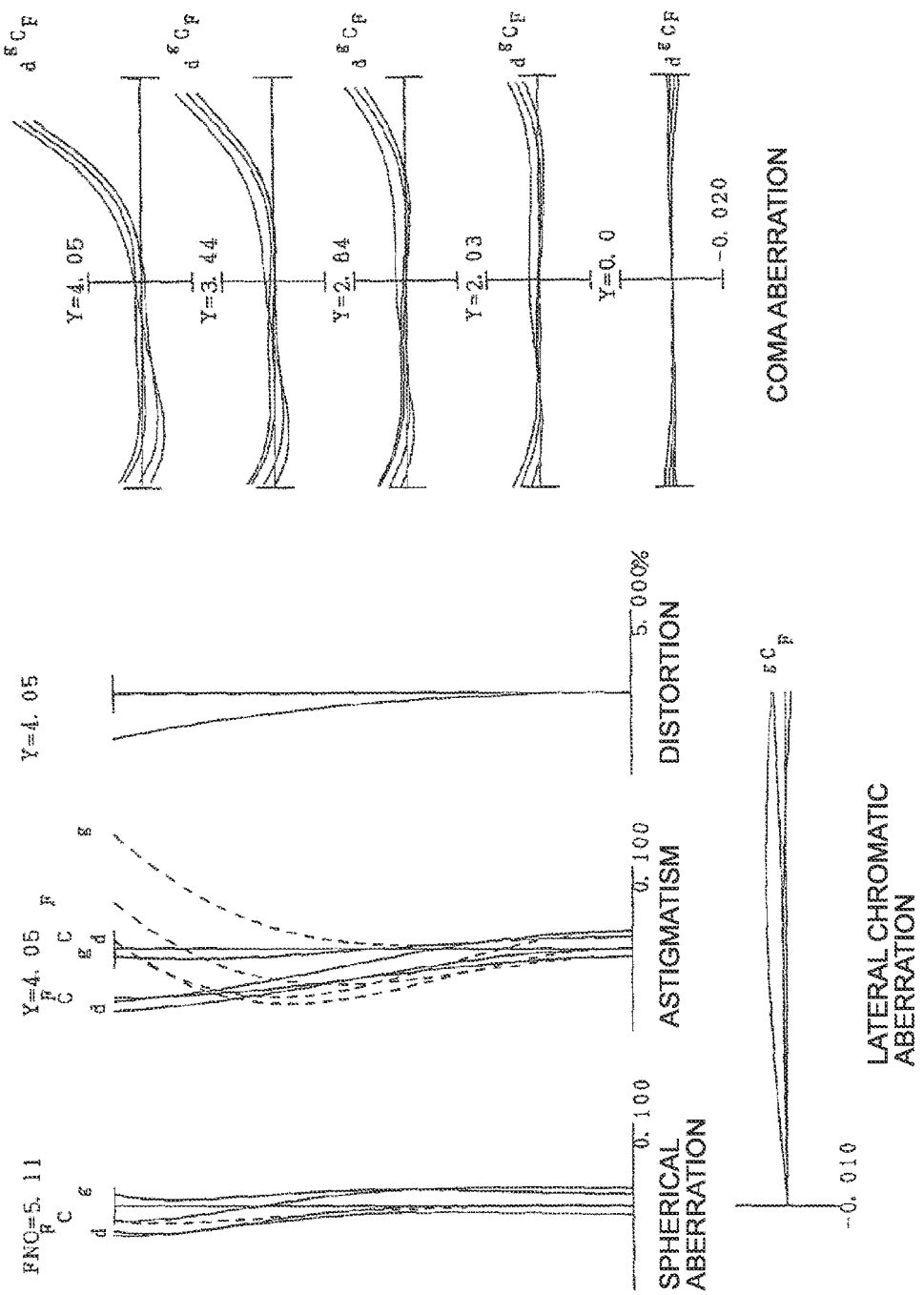

Embodiments of the present invention will now be described with reference to the drawings. Many of the composing elements in Embodiment 1 and Embodiment 2 are the same or similar, therefore same or similar composing elements are described using a same drawing (same reference symbol) for convenience of explanation.

Embodiment 1

As shown in FIG. 1, a zoom lens ZL according to Embodiment 1 includes, in order from an object, a first lens group G1 having negative refractive power and a second lens group G2 having positive refractive power, and satisfies the following conditional expression (1).

$$1.90 < ft/Gf2 < 3.50 \qquad (1)$$

where ft denotes a focal length of the zoom lens ZL in the telephoto end state, and Gf2 denotes a focal length of the second lens group G2.

Conditional expression (1) is used for specifying an appropriate ratio between the focal length of the zoom lens ZL in the telephoto end state and the focal length of the second lens group G2. If the upper limit value of the conditional expression (1) is exceeded, the size of the second lens group G2 increases, which is not desirable. If the required size is satisfied, it becomes difficult to correct the fluctuation of longitudinal chromatic aberration and coma aberration upon zooming, which is not desirable. If the lower limit value of the conditional expression (1) is not reached, it becomes difficult to implement a wide angle of view, which is not desirable. If the required angle of view is satisfied, it becomes difficult to correct the fluctuation of spherical aberration upon zooming, which is not desirable.

To demonstrate the effect of Embodiment 1 with certainty, it is preferable that the upper limit value of the conditional expression (1) is 3.20. To demonstrate the effect of Embodiment 1 to the maximum, it is preferable that the upper limit value of the conditional expression (1) is 3.00.

To demonstrate the effect of Embodiment 1 with certainty, it is preferable that the lower limit value of the conditional expression (1) is 2.00. To demonstrate the effect of Embodiment 1 to the maximum, it is preferable that the lower limit value of the conditional expression (1) is 2.10.

It is preferable that the zoom lens ZL according to Embodiment 1 satisfies the following conditional expression (2).

$$1.85 < N1AV \qquad (2)$$

where N1AV denotes an average value of refractive indexes at d-line of optical materials of the lenses constituting the first lens group G1.

Conditional expression (2) is used for specifying an appropriate value of the average value of the refractive indexes of the optical materials of the lenses constituting the first lens group G1. If the lower limit value of the conditional expression (2) is not reached, the size of the first lens group G1 increases, which is not desirable. If the required size of the first lens group G1 is satisfied, it becomes difficult to correct fluctuation of spherical aberration upon zooming, which is not desirable.

To demonstrate the effect of Embodiment 1 with certainty, it is preferable that the lower limit value of the conditional expression (2) is 1.88.

It is preferable that the zoom lens ZL according to Embodiment 1 satisfies the following conditional expression (3).

$$1.50 < N2AV < 1.80 \qquad (3)$$

where N2AV denotes an average value of refractive indexes at d-line of optical materials of the lenses constituting the second lens group G2.

Conditional expression (3) is used for specifying an appropriate value of the average value of the refractive indexes of the optical materials of the lenses constituting the second lens group G2. If the upper limit value of the conditional expression (3) is exceeded, it becomes difficult to correct fluctuation of lateral chromatic aberration upon zooming, which is not desirable. If the lower limit value of the conditional expression (3) is not reached, it becomes difficult to correct fluctuation of spherical aberration upon zooming, which is not desirable.

To demonstrate the effect of Embodiment 1 with certainty, it is preferable that the upper limit value of the conditional expression (3) is 1.75. To demonstrate the effect of Embodiment 1 to the maximum, it is preferable that the upper limit value of the conditional expression (3) is 1.70.

To demonstrate the effect of Embodiment 1 with certainty, it is preferable that the lower limit value of the conditional expression (3) is 1.55. To demonstrate the effect of Embodiment 1 to the maximum, it is preferable that the lower limit value of the conditional expression (3) is 1.60.

It is preferable that the zoom lens ZL according to Embodiment 1 satisfies the following conditional expression (4).

$$0.10 < fw/Gf2 < 0.55 \qquad (4)$$

where fw denotes a focal length of the zoom lens ZL in the wide-angle end state, and Gf2 denotes a focal length of the second lens group G2.

The conditional expression (4) is used for satisfying an appropriate ratio between the focal length of the zoom lens ZL in the wide-angle end state and the focal length of the second lens group G2. If the upper limit value of the conditional expression (4) is exceeded, it becomes difficult to implement a wide angle of view, which is not desirable. If the required wide angle of view is satisfied, it becomes difficult to correct fluctuation of spherical aberration upon zooming, which is not desirable. If the lower limit value of the conditional expression (4) is not reached, the size of the entire camera increases, which is not desirable. If the required size of the camera is satisfied, it becomes difficult to correct fluctuation of curvature of field and lateral chromatic aberration upon zooming, which is not desirable.

To demonstrate the effect of Embodiment 1 with certainty, it is preferable that the upper limit value of the conditional expression (4) is 0.53. To demonstrate the effect of Embodiment 1 to the maximum, it is preferable that the upper limit value of the conditional expression (4) is 0.50.

To demonstrate the effect of Embodiment 1 with certainty, it is preferable that the lower limit value of the conditional expression (4) is 0.15. To demonstrate the effect of Embodiment 1 to the maximum, it is preferable that the lower limit value of the conditional expression (4) is 0.20.

In the zoom lens ZL according to Embodiment 1, it is preferable that the first lens group G1 is constituted only by, in order from the object, a negative lens and a positive lens. By this configuration, various aberrations generated in the first lens group G1 can be corrected. Moreover, it becomes easy to correct curvature of field, longitudinal chromatic aberration and lateral chromatic aberration generated in the zoom lens as a whole.

In the zoom lens ZL according to Embodiment 1, it is preferable that the second lens group G2 is constituted by at least one positive lens and at least one negative lens. By this configuration, chromatic aberration generated in the second lens group G2 can be corrected, and as a result, fluctuation of the longitudinal chromatic aberration and the lateral chromatic aberration upon zooming can be appropriately corrected.

In the zoom lens ZL according to Embodiment 1, it is preferable that the second lens group G2 is constituted only by, in order from the object, a positive lens, a negative lens and a positive lens. By this configuration, various aberrations generated in the second lens group G2 can be corrected. It also becomes easy to correct the spherical aberration and coma aberration generated in the zoom lens as a whole.

In the zoom lens ZL according to Embodiment 1, it is preferable that respective lenses constituting the second lens group G2 are disposed via air. By this configuration, it becomes easy to correct coma aberration.

In the zoom lens ZL according to Embodiment 1, it is preferable that the distance between the first lens group G1 and the second lens group G2 changes upon zooming from the wide-angle end state to the telephoto end state. By this configuration, the focal length of the optical system from the wide-angle end state to the telephoto end state can be changed, whereby a zoom lens can be created.

In the zoom lens ZL according to Embodiment 1, it is preferable that the first lens group G1 moves along a path having convex curve toward the image, and the second lens group G2 moves toward the object, upon zooming from the wide-angle end state to the telephoto end state. By this configuration, zooming can be performed while maintaining the reference aberrations of spherical aberration, coma aberrations and the like.

Figure 9A:
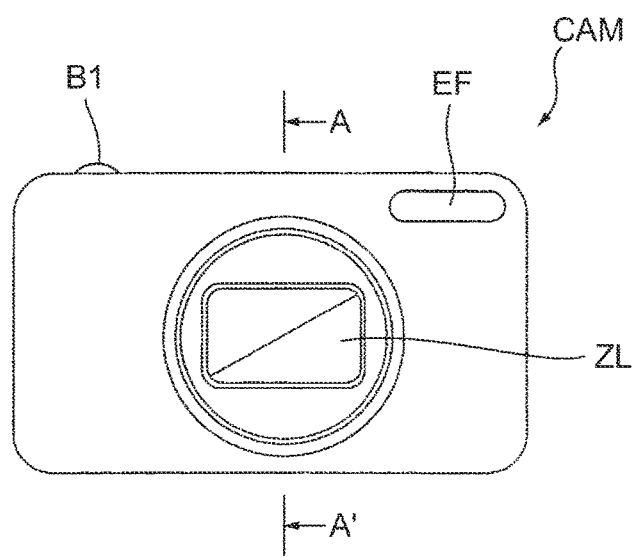
FIGS. 9A and 9B show a digital camera (optical apparatus) including the zoom lens according to the embodiments, where
Figure 9B:
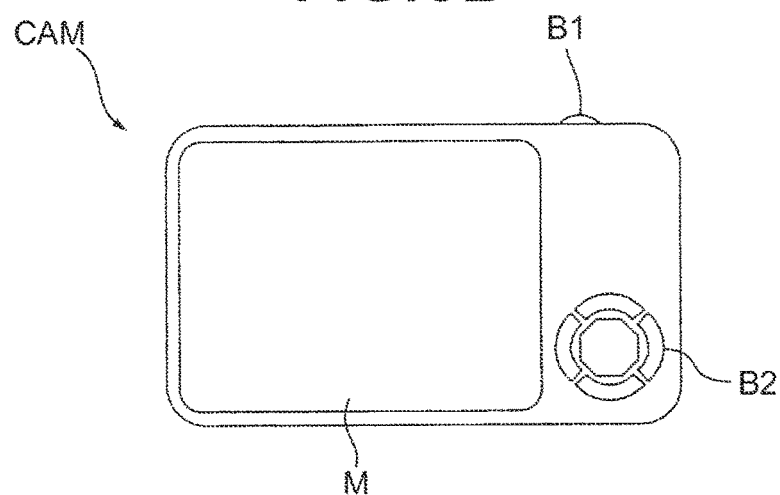
Figure 10:
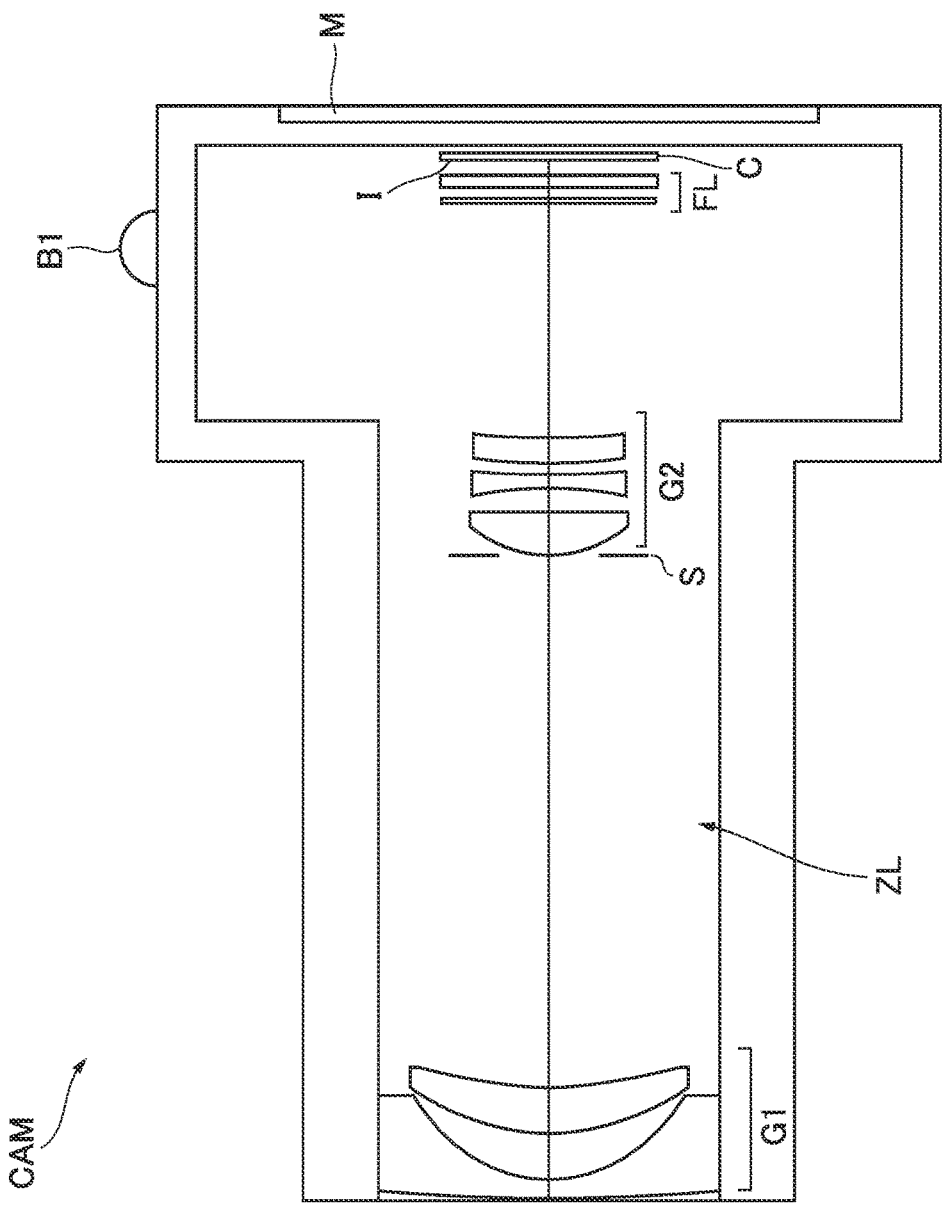
FIG. 10 is a cross-sectional view along the A-A' line in FIG. 9A.

A digital still camera CAM, which is an optical apparatus including the zoom lens ZL of Embodiment 1, will be described with reference to FIGS. 9A and 9B and FIG. 10. If a power button (not illustrated) is pressed on the digital still camera CAM, a shutter (not illustrated) of the image capturing lens (zoom lens ZL) is released, and lights from an object are collected by the zoom lens ZL, and form an image on a picture element C (e.g. CCD, CMOS), which is disposed on the image plane I (see FIG. 1). The object image formed on the picture element C is displayed on a liquid crystal monitor M disposed on the back of the digital still camera CAM. The user determines the composition of the object image while viewing the liquid crystal monitor M, then presses a release button B1 to capture the object image by the picture element C, and stores it in memory (not illustrated).

The camera CAM has, for example, an auxiliary light emitting unit EF which emits auxiliary light when the object is dark, and a function button B2 which is used for setting various conditions for the digital still camera CAM. Here a compact type camera, in which the camera CAM and the zoom lens ZL are integrated, is illustrated, but the optical apparatus to which the present invention is applied may be a single lens reflex camera, where a lens barrel including the zoom lens ZL and camera body main unit are detachable.

If the zoom lens ZL according to this embodiment is used as an image capturing lens for the camera CAM having the above configuration, a camera which has a high zoom ratio, a wide angle of view, compactness and ultra high image quality can be implemented.

Figure 11:
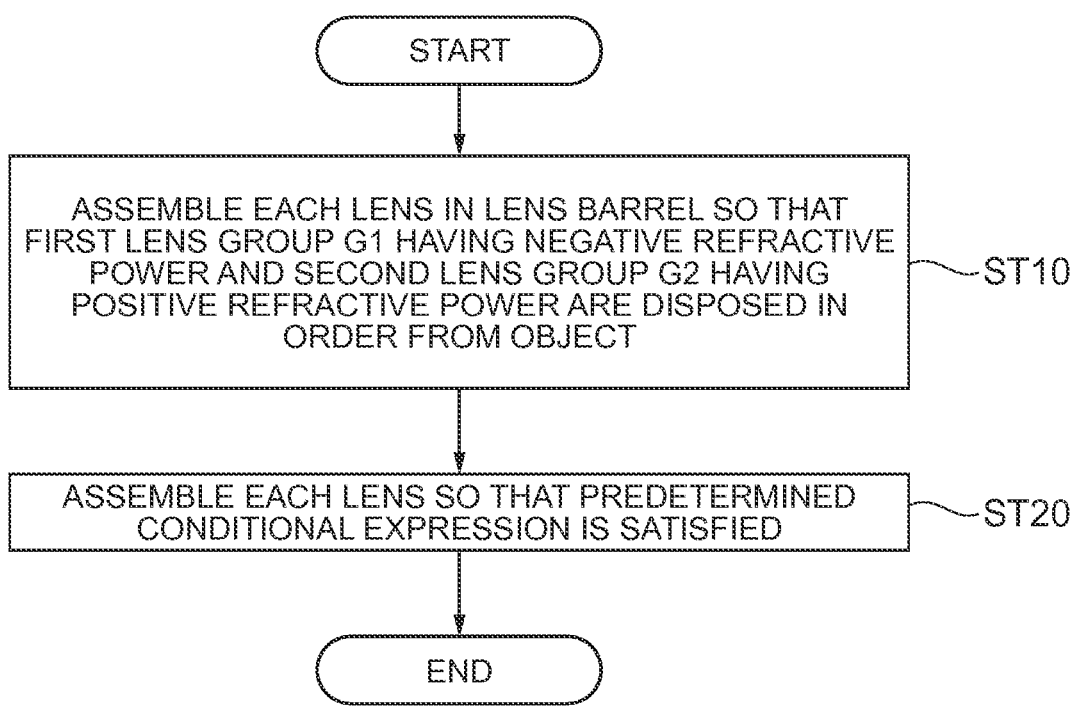
FIG. 11 is a flow chart depicting a manufacturing method for the zoom lens according to the embodiments.

A manufacturing method for the zoom lens ZL of Embodiment 1 will be described with reference to FIG. 11. First the first lens group G1 having negative refractive power and the second lens group G2 having positive refractive power are assembled in a lens barrel in order from the object (step ST10). At this time, each lens is assembled so that a predetermined conditional expression (1) is satisfied (step ST20).

$$1.90 < ft/Gf2 < 3.50 \qquad (1)$$

where ft denotes a focal length of the zoom lens ZL in the telephoto end state, and Gf2 denotes a focal length of the second lens group G2.

An example of the lens configuration according to Embodiment 1 is as follows. As shown in FIG. 1, a negative meniscus lens L11 having a convex surface facing the object and a positive meniscus lens L12 having a convex surface facing the object are assembled as the first lens group G1, so that this lens group as a whole has negative refractive power. Then a positive meniscus lens L21 having a convex surface facing the object, a biconcave negative lens L22 and a biconvex positive lens L23 are assembled, in order from the object, as the second lens group G2, so that this lens group as a whole has positive refractive power. Each lens is assembled so that the correspondence value of the conditional expression (1) is 2.50387.

If the manufacturing method according to Embodiment 1 is used, a zoom lens ZL, which is suitable for video cameras, electronic still cameras and the like using solid-state image sensors or the like, and has a high zoom ratio, a wide angle of view, compactness and ultra high image quality, can be implemented.

Embodiment 2

As shown in FIG. 1, a zoom lens ZL according to Embodiment 2 includes, in order from an object, a first lens group G1 having negative refractive power and a second lens group G2 having positive refractive power, and satisfies the following conditional expression (4).

$$0.10 < fw/Gf2 < 0.55 \qquad (4)$$

where fw denotes a focal length of the zoom lens ZL in the wide-angle end state, and Gf2 denotes a focal length of the second lens group G2.

The conditional expression (4) is used for specifying an appropriate ratio between the focal length of the zoom lens ZL in the wide-angle end state and the focal length of the second lens group G2. If the upper limit value of the conditional expression (4) is exceeded, it becomes difficult to implement a wide angle of view, which is not desirable. If the required angle of view is satisfied, it becomes difficult to correct fluctuation of spherical aberration upon zooming, which is not desirable. If the lower limit value of the conditional expression (4) is not reached, the size of the entire camera increases, which is not desirable. If the required size of the camera is satisfied, it becomes difficult to correct fluctuation of curvature of field and lateral chromatic aberration upon zooming, which is not desirable.

To demonstrate the effect of Embodiment 2 with certainty, it is preferable that the upper limit value of the conditional expression (4) is 0.53. To demonstrate the effect of Embodiment 2 to the maximum, it is preferable that the upper limit value of the conditional expression (4) is 0.50.

To demonstrate the effect of Embodiment 2 with certainty, it is preferable that the lower limit value of the conditional expression (4) is 0.15. To demonstrate the effect of Embodiment 2 to the maximum, it is preferable that the lower limit value of the conditional expression (4) is 0.20.

It is preferable that the zoom lens ZL according to Embodiment 2 satisfies the following conditional expression (2).

$$1.85 < N1AV \tag{2}$$

where N1AV denotes an average value of refractive indexes at d-line of optical materials of the lenses constituting the first lens group G1.

Conditional expression (2) is used for specifying an appropriate value of the average value of the refractive indexes of the optical materials of the lenses constituting the first lens group G1. If the lower limit value of the conditional expression (2) is not reached, the size of the first lens group G1 increases, which is not desirable. If the required size of the first lens group G1 is satisfied, it becomes difficult to correct fluctuation of spherical aberration upon zooming, which is not desirable.

To demonstrate the effect of Embodiment 2 with certainty, it is preferable that the lower limit value of the conditional expression (2) is 1.88.

It is preferable that the zoom lens ZL according to Embodiment 2 satisfies the following conditional expression (3).

$$1.50 < N2AV < 1.80 \tag{3}$$

where N2AV denotes an average value of refractive indexes at d-line of optical materials of the lenses constituting the second lens group G2.

Conditional expression (3) is used for specifying an appropriate value of the average value of the refractive indexes of the optical materials of the lenses constituting the second lens group G2. If the upper limit value of the conditional expression (3) is exceeded, it becomes difficult to correct fluctuation of lateral chromatic aberration upon zooming, which is not desirable. If the lower limit value of the conditional expression (3) is not reached, it becomes difficult to correct fluctuation of spherical aberration upon zooming, which is not desirable.

To demonstrate the effect of Embodiment 2 with certainty, it is preferable that the upper limit value of the conditional expression (3) is 1.75. To demonstrate the effect of Embodiment 2 to the maximum, it is preferable that the upper limit value of the conditional expression (3) is 1.70.

To demonstrate the effect of Embodiment 2 with certainty, it is preferable that the lower limit value of the conditional expression (3) is 1.55. To demonstrate the effect of Embodiment 2 to the maximum, it is preferable that the lower limit value of the conditional expression (3) is 1.60.

A digital still camera CAM, which is an optical apparatus including the zoom lens ZL of Embodiment 2, will be described with reference to FIGS. 9A and 9B and FIG. 10. If a power button (not illustrated) is pressed on the digital still camera CAM, a shutter (not illustrated) of the image capturing lens (zoom lens ZL) is released, and lights from an object are collected by the zoom lens ZL, and form an image on a picture element C (e.g. CCD, CMOS), which is disposed on the image plane I (see FIG. 1). The object image formed on the picture element C is displayed on a liquid crystal monitor M disposed on the back of the digital still camera CAM. The user determines the composition of the object image while viewing the liquid crystal monitor M, then presses a release button B1 to capture the object image by the picture element C, and stores it in memory (not illustrated).

The camera CAM has, for example, an auxiliary light emitting unit EF which emits auxiliary light when the object is dark, and a function button B2 which is used for setting various conditions for the digital still camera CAM. Here a compact type camera, in which the camera CAM and the zoom lens ZL are integrated, is illustrated, but the optical apparatus to which the present invention is applied may be a single lens reflex camera, where a lens barrel including the zoom lens ZL and camera body main unit are detachable.

If the zoom lens ZL according to this embodiment is used as an image capturing lens for the camera CAM having the above configuration, a camera which has a high zoom ratio, a wide angle of view, compactness and ultra high image quality can be implemented.

A manufacturing method for the zoom lens ZL of Embodiment 2 will be described with reference to FIG. 11. First the first lens group G1 having negative refractive power and the second lens group G2 having positive refractive power are assembled in a lens barrel in order from the object (step ST10). At this time, each lens is assembled so that a predetermined conditional expression (4) is satisfied (step ST20).

$$0.10 < fw/Gf2 < 0.55 \tag{4}$$

where fw denotes a focal length of the zoom lens ZL in the wide-angle end state, and Gf2 denotes a focal length of the second lens group G2.

An example of the lens configuration according to Embodiment 2 is as follows. As shown in FIG. 1, a negative meniscus lens L11 having a convex surface facing the object and a positive meniscus lens L12 having a convex surface facing the object are assembled as the first lens group G1, so that this lens group as a whole has negative refractive power. Then a positive meniscus lens L21 having a convex surface facing the object, a biconcave negative lens L22 and a biconvex positive lens L23 are assembled, in order from the object, as the second lens group G2, so that this lens group as a whole has positive refractive power. Each lens is assembled so that the correspondence value of the conditional expression (4) is 0.44312.

If the manufacturing method according to Embodiment 2 is used, a zoom lens ZL, which is suitable for video cameras, electronic still cameras and the like using solid-state image sensors or the like, and has a high zoom ratio, a wide angle of view, compactness and ultra high image quality, can be implement.

EXAMPLES

Each example of Embodiments 1 and 2 will now be described with reference to the drawings. Table 1 to Table 4 herein below are data tables of Example 1 to Example 4 respectively.

To avoid a complicated explanation due to increase in number of digits of reference symbols, each reference symbol in FIG. 1 according to Example 1 is independently used from the other examples. Therefore even if a reference symbol is the same as another example, this does not mean that configurations thereof are the same.

In each example, C-line (wavelength: 656.2730 nm), d-line (wavelength: 587.5620 nm), F-line (wavelength: 486.1330 nm) and g-line (wavelength: 435.8350 nm) are used to calibrate aberration characteristics.

In [Lens Data] in each table, the surface number indicates the number assigned to the optical surface counted from the object side along the ray traveling direction, R indicates a radius of curvature of each optical surface, D indicates a surface distance from each optical surface to the next optical surface (or image plane) on the optical axis, nd indicates a refractive index of the material of the optical member at d-line, and νd indicates an Abbe number of the material of the optical member at d-line. The object plane indicates the object surface, (Variable) indicates a variable surface distance, "∞" of the radius of curvature indicates a plane or aperture, (Stop S) indicates an aperture stop S, and the image plane indicates the image plane I. The refractive index of air "1.000000" is omitted. If the optical surface is aspherical, "*" is attached to the surface member, and the paraxial radius of curvature is shown in the column of the radius of curvature R.

In [Aspherical Data] in each table, the shape of the aspherical surface shown in [Lens Data] is given by the following Expression (a). X(y) denotes a distance along the optical axis from the tangential plane at the vertex of the aspherical surface to the position on the aspherical surface at height y, r denotes a radius of curvature (paraxial radius of curvature) of the reference spherical surface, κ denotes a conical coefficient, and Ai denotes an aspherical coefficient at degree i. "E-n" indicates ×10$^{-n}$"). For example, 1.234E-05=1.234×10$^{-5}$.

$$X(y)=(y^2/r)\{1+(1-\kappa \times y^2/r^2)^{1/2}\}+A4 \times y^4+A6 \times y^6+A8 \times y^8+A10 \times y^{10} \quad (a)$$

In [General Data] in each table, f indicates a focal length of the zoom lens as a whole, FNo indicates an F number, ω indicates a half angle of view (unit: °), Y indicates an image height, TL indicates the total length of the zoom lens, Bf indicates a distance from the image side surface of an optical member disposed closest to the image to the paraxial image plane, and Bf (air conversion) indicates a distance from the final optical surface to the paraxial image plane converted into air.

In [Variable Distance Data] in each table, each variable distance Di in the wide-angle end state, the intermediate focal length state and the telephoto end state are shown respectively. Di indicates a variable distance between the i-th surface and the (i+1)th surface.

In [Lens Group Data] in each table, G indicates a group number, "First Surface of Group" indicates a surface number of the surface closest to the object in each group, "Group Focal Length" indicates a focal length of each group, and "Lens Configuration Length" indicates a distance on the optical axis from the lens surface closest to the object to the lens surface closest to the image in each group.

In [Conditional Expression] in each table, values corresponding to the above mentioned conditional expressions (1) to (4) are shown.

In all the data values, "mm" is normally used as the unit of the focal length f, radius of curvature R, surface distance D and other lengths, unless otherwise specified, but unit is not limited to "mm" and another appropriate unit may be used since an equivalent optical performance is acquired even if an optical system is proportionally expanded or proportionally reduced.

The description on the tables is common for all the examples, hence this description is omitted herein below.

Example 1

Example 1 will be described with reference to FIG. 1, FIGS. 2A to 2C and Table 1. As FIG. 1 shows, a zoom lens ZL (ZL1) according to Example 1 is constituted by, in order from the object, a first lens group G1 having negative refractive power, and a second lens group G2 having positive refractive power.

The first lens group G1 is constituted by, in order from the object, a negative meniscus lens L11 having a convex surface facing the object, and a positive meniscus lens L12 having a convex surface facing the object. The image side lens surface of the negative meniscus lens L11, and the object side, and the image side lens surfaces of the positive meniscus lens L12 are aspherical.

The second lens group G2 is constituted by, in order from the object, a positive meniscus lens L21 having a convex surface facing the object, a biconcave negative lens L22 and a biconvex positive lens L23. The image side lens surface of the positive meniscus lens L21 and the image side lens surface of the biconvex positive lens L23 are aspherical.

An aperture stop S is disposed between the first lens group G1 and the second lens group G2, in order to adjust the quantity of light. A filter group FL constituted by a low pass filter, an infrared cut-off filter and the like is disposed between the second lens group G2 and the image plane I, in order to cut off a spatial frequency exceeding the critical resolution of the solid-state image sensor, such as a CCD, disposed on the image plane I.

In this example having the above mentioned configuration, the first lens group G1 moves toward the image plane first, then moves toward the object upon zooming from the wide-angle end state to the telephoto end state. At this time, the second lens group G2 moves toward the object. The aperture stop S moves together with the second lens group G2 toward the object.

Table 1 below shows each data of Example 1. The surface numbers 1 to 15 in Table 1 correspond to each optical surface of radius of curvatures R1 to R15 in FIG. 1. In Example 1, Surface 2, Surface 3, Surface 4, Surface 7 and Surface 11 are aspherical.

TABLE 1

| [Lens Data] | | | | |
|---|---|---|---|---|
| Surface number | R | D | nd | νd |
| Object plane | ∞ | | | |
| 1 | 82.0606 | 0.8000 | 1.851348 | 40.10 |
| *2(aspherical) | 5.5748 | 1.9000 | | |
| *3(aspherical) | 7.9140 | 1.9500 | 1.922860 | 20.88 |
| *4(aspherical) | 12.7190 | D4(variable) | | |
| 5(stop S) | ∞ | 0.0000 | | |
| 6 | 5.1346 | 1.8500 | 1.592014 | 67.02 |
| *7(aspherical) | 548.4080 | 0.9500 | | |
| 8 | −18.3001 | 0.6000 | 1.846660 | 23.78 |
| 9 | 39.9717 | 0.5000 | | |
| 10 | 29.2624 | 1.1000 | 1.589130 | 61.25 |
| *11(aspherical) | −26.0163 | D11(variable) | | |
| 12 | ∞ | 0.2100 | 1.516798 | 64.20 |
| 13 | ∞ | 0.5000 | | |

TABLE 1-continued

[Lens Data]

| 14 | ∞ | 0.5000 | 1.516798 | 64.20 |
|---|---|---|---|---|
| 15 | ∞ | Bf | | |
| Image plane | ∞ | | | |

[Aspherical data]

Surface 2

$\kappa = -1.7205$, $A4 = 1.03990E-03$, $A6 = 1.13543E-05$, $A8 = -1.75872E-07$, $A10 = 0.00000E+00$ Surface 3

$\kappa = 1.0000$, $A4 = -1.01400E-03$, $A6 = 2.95661E-05$, $A8 = -4.74454E-07$, $A10 = 0.00000E+00$ Surface 4

$\kappa = 1.0000$, $A4 = -8.08370E-04$, $A6 = 2.21399E-05$, $A8 = -3.88962E-07$, $A10 = 0.00000E+00$ Surface 7

$\kappa = 1.0000$, $A4 = 1.80148E-05$, $A6 = -4.62703E-05$, $A8 = 1.75705E-06$, $A10 = 0.00000E+00$ Surface 11

$\kappa = 1.0000$, $A4 = 1.81451E-03$, $A6 = 1.02383E-04$, $A8 = 4.23164E-06$, $A10 = 0.00000E+00$

[General Data]
Zoom ratio 5.65048

| | Wide-angle end | Intermediate position | Telephoto end |
|---|---|---|---|
| f (focal length of zoom lens) | 4.78860 | 11.41066 | 27.05792 |
| FNo (F number) | 3.63737 | 5.12045 | 6.91022 |
| ω (half angle of view) | 42.65341 | 20.05202 | 8.52384 |
| Y (image height) | 3.65000 | 4.05000 | 4.05000 |
| TL (total lens length) | 43.81437 | 34.61907 | 42.67463 |
| Bf | 0.60000 | 0.59999 | 0.59998 |
| Bf (air conversion) | 1.56809 | 1.56809 | 1.56807 |

[Variable Distance Data]

| | Wide-angle end | Intermediate position | Telephoto end |
|---|---|---|---|
| D4 | 22.51899 | 7.20414 | 0.79983 |
| D11 | 9.83539 | 15.95494 | 30.41482 |

[Lens Group Data]

| Group number | First surface of group | Group focal length | Lens configuration length |
|---|---|---|---|
| G1 | 1 | −11.69382 | 4.65 |
| G2 | 6 | 10.80644 | 5.00 |

[Conditional Expressions]

Conditional expression (1) ft/Gf2 = 2.50387
Conditional expression (2) N1AV = 1.88710
Conditional expression (3) N2AV = 1.67593
Conditional expression (4) fw/Gf2 = 0.44312

As Table 1 shows, the zoom lens ZL1 according to this example satisfies the conditional expressions (1) to (4).

FIGS. 2A to 2C show graphs of various aberrations (spherical aberration, astigmatism, distortion, coma aberration and lateral chromatic aberration) of the zoom lens ZL1 according to Example 1, where FIG. 2A shows graphs of various aberrations upon focusing on infinity in the wide-angle end state, FIG. 2B shows graphs of various aberrations upon focusing on infinity in the intermediate focal length state, and FIG. 2C shows graphs of various aberrations upon focusing on infinity in the telephoto end state.

In each graph showing aberrations, FNO indicates an F number, and Y indicates an image height. d indicates each aberration at d-line, g indicates each aberration at g-line, C indicates each aberration at C-line, and F indicates each aberration at F-line. No indication refers to an aberration at d-line. In each graph showing spherical aberration, the solid line indicates the spherical aberration. In each graph showing astigmatism, the solid line indicates the sagittal image plane, and the broken line indicates the meridional image plane. In each graph showing coma aberration, the solid line indicates a meridional coma.

The above description on the graphs showing aberrations is the same for the other examples, where this description is omitted.

As each graph showing aberrations clarifies, the zoom lens according to Example 1 has an excellent optical performance, where various aberrations are corrected well in each focal length state from the wide-angle end state to the telephoto end state.

Example 2

Example 2 will be described with reference to FIG. 3, FIGS. 4A to 4C and Table 2. As FIG. 3 shows, a zoom lens ZL (ZL2) according to Example 2 is constituted by, in order from the object, a first lens group G1 having negative refractive power, and a second lens group G2 having positive refractive power.

The first lens group G1 is constituted by, in order from the object, a negative meniscus lens L11 having a convex surface facing the object, and a positive meniscus lens L12 having a convex surface facing the object. The image side lens surface of the negative meniscus lens L11, and the object side and the image side lens surfaces of the positive meniscus lens L12 are aspherical.

The second lens group G2 is constituted by, in order from the object, a biconvex positive lens L21, a biconcave negative lens L22, and a biconvex positive lens L23. The image side lens surface of the biconvex positive lens L21 and the image side lens surface of the biconvex positive lens L23 are aspherical.

An aperture stop S is disposed between the first lens group G1 and the second lens group G2, in order to adjust the quantity of light. A filter group FL constituted by a low pass filter, an infrared cut-off filter and the like is disposed between the second lens group G2 and the image plane I, in order to cut off a spatial frequency exceeding the critical resolution of the solid-state image sensor, such as a CCD, disposed on the image plane I.

In this example having the above mentioned configuration, the first lens group G1 moves toward the image plane first, then moves toward the object upon zooming from the wide-angle end state to the telephoto end state. At this time, the second lens group G2 moves toward the object. The aperture stop S moves together with the second lens group G2 toward the object.

Table 2 below shows each data of Example 2. The surface numbers 1 to 15 in Table 2 correspond to each optical surface of radius of curvatures R1 to R15 in FIG. 3. In Example 2, Surface 2, Surface 3, Surface 4, Surface 7 and Surface 11 are aspherical.

TABLE 2

[Lens Data]

| Surface number | R | D | nd | νd |
|---|---|---|---|---|
| Object plane | ∞ | | | |
| 1 | 69.2149 | 0.8000 | 1.851348 | 40.10 |
| *2(aspherical) | 5.5622 | 1.9000 | | |
| *3(aspherical) | 8.2841 | 1.9500 | 1.922860 | 20.88 |
| *4(aspherical) | 13.5219 | D4(variable) | | |
| 5(stop S) | ∞ | 0.0000 | | |
| 6 | 5.3034 | 1.8500 | 1.592014 | 67.02 |
| *7(aspherical) | −81.5941 | 0.9500 | | |
| 8 | −16.4924 | 0.8000 | 1.846660 | 23.78 |
| 9 | 56.6892 | 0.5500 | | |
| 10 | 32.5897 | 1.1000 | 1.589130 | 61.25 |
| *11(aspherical) | −31.1656 | D11(variable) | | |
| 12 | ∞ | 0.2100 | 1.516798 | 64.20 |
| 13 | ∞ | 0.5000 | | |
| 14 | ∞ | 0.5000 | 1.516798 | 64.20 |
| 15 | ∞ | Bf | | |
| Image plane | ∞ | | | |

[Aspherical data]

Surface 2

κ = −1.6302, A4 = 1.09431E−03, A6 = 1.67301E−05, A8 = −3.16192E−07, A10 = 0.00000E+00

Surface 3

κ = 1.0000, A4 = −9.13143E−04, A6 = 3.19459E−05, A8 = −5.43434E−07, A10 = 0.00000E+00

Surface 4

κ = 1.0000, A4 = −7.70407E−04, A6 = 2.26486E−05, A8 = −4.30953E−07, A10 = 0.00000E+00

Surface 7

κ = 1.0000, A4 = −1.70933E−05, A6 = −2.83719E−05, A8 = 1.07331E−06, A10 = 0.00000E+00

Surface 11

κ = 1.0000, A4 = 1.73510E−03, A6 = 8.18597E−05, A8 = 3.79787E−06, A10 = 0.00000E+00

[General Data]
Zoom ratio 5.65048

| | Wide-angle end | Intermediate position | Telephoto end |
|---|---|---|---|
| f (focal length of zoom lens) | 4.78860 | 11.41066 | 27.05792 |
| FNo (F number) | 3.63906 | 5.12404 | 6.91660 |
| ω (half angle of view) | 42.40871 | 20.05698 | 8.52317 |
| Y (image height) | 3.65000 | 4.05000 | 4.05000 |
| TL (total lens length) | 43.90175 | 34.70644 | 42.76200 |

TABLE 2-continued

[Lens Data]

| Bf | 0.60000 | 0.59999 | 0.59998 |
|---|---|---|---|
| Bf (air conversion) | 1.56809 | 1.56809 | 1.56807 |

[Variable Distance Data]

| | Wide-angle end | Intermediate position | Telephoto end |
|---|---|---|---|
| D4 | 22.51913 | 7.20428 | 0.79998 |
| D11 | 9.67262 | 15.79217 | 30.25205 |

[Lens Group Data]

| Group number | First surface of group | Group focal length | Lens configuration length |
|---|---|---|---|
| G1 | 1 | −11.69382 | 4.65 |
| G2 | 6 | 10.80644 | 5.25 |

[Conditional Expressions]

Conditional expression (1) ft/Gf2 = 2.50387
Conditional expression (2) N1AV = 1.88710
Conditional expression (3) N2AV = 1.67593
Conditional expression (4) fw/Gf2 = 0.44312

As Table 2 shows, the zoom lens ZL2 according to this example satisfies the conditional expressions (1) to (4).

FIGS. 4A to 4C show graphs of various aberrations (spherical aberration, astigmatism, distortion, coma aberration and lateral chromatic aberration) of the zoom lens ZL2 according to Example 2, where FIG. 4A shows graphs of various aberrations upon focusing on infinity in the wide-angle end state, FIG. 4B shows graphs of various aberrations upon focusing on infinity in the intermediate focal length state, and FIG. 4C shows graphs of various aberrations upon focusing on infinity in the telephoto end state.

As each graph showing aberrations clarifies, the zoom lens according to Example 2 has an excellent optical performance, where various aberrations are corrected well in each focal length state from the wide-angle end state to the telephoto end state.

Example 3

Example 3 will be described with reference to FIG. 5, FIGS. 6A to 6C and Table 3. As FIG. 5 shows, a zoom lens ZL (ZL3) according to Example 3 is constituted by, in order from the object, a first lens group G1 having negative refractive power, and a second lens group G2 having positive refractive power.

The first lens group G1 is constituted by, in order from the object, a negative meniscus lens L11 having a convex surface facing the object, and a positive meniscus lens L12 having a convex surface facing the object. The image side lens surface of the negative meniscus lens L11, and the object side and the image side lens surfaces of the positive meniscus lens L12 are aspherical.

The second lens group G2 is constituted by, in order from the object, a biconvex positive lens L21, a biconcave negative lens L22, and a biconvex positive lens L23. The image side lens surface of the biconvex positive lens L21 and the image side lens surface of the biconvex positive lens L23 are aspherical.

An aperture stop S is disposed between the first lens group G1 and the second lens group G2, in order to adjust the quantity of light. A filter group FL constituted by a low pass filter, an infrared cut-off filter and the like is disposed between the second lens group G2 and the image plane I, in order to cut off a spatial frequency exceeding the critical resolution of the solid-state image sensor, such as a CCD, disposed on the image plane I.

In this example having the above mentioned configuration, the first lens group G1 moves toward the image plane first, then moves toward the object upon zooming from the wide-angle end state to the telephoto end state. At this time, the second lens group G2 moves toward the object. The aperture stop S moves together with the second lens group G2 toward the object.

Table 3 below shows each data of Example 3. The surface numbers 1 to 15 in Table 3 correspond to each optical surface of radius of curvatures R1 to R15 in FIG. 5. In Example 3, Surface 2, Surface 3, Surface 4, Surface 7 and Surface 11 are aspherical.

TABLE 3

[Lens Data]

| Surface number | R | D | nd | vd |
|---|---|---|---|---|
| Object plane | ∞ | | | |
| 1 | 114.4793 | 0.8000 | 1.851348 | 40.10 |
| *2(aspherical) | 5.7008 | 1.9000 | | |
| *3(aspherical) | 8.6534 | 1.9825 | 1.922860 | 20.88 |
| *4(aspherical) | 15.0000 | D4(variable) | | |
| 5(stop S) | ∞ | 0.0000 | | |
| 6 | 5.1878 | 1.8000 | 1.592014 | 67.02 |

TABLE 3-continued

[Lens Data]

| | | | | |
|---|---|---|---|---|
| *7(aspherical) | −151.3354 | 0.8414 | | |
| 8 | −34.0204 | 0.8000 | 1.846660 | 23.78 |
| 9 | 20.2133 | 0.5607 | | |
| 10 | 34.4477 | 1.2024 | 1.589130 | 61.25 |
| *11(aspherical) | −29.8007 | D11(variable) | | |
| 12 | ∞ | 0.2100 | 1.516798 | 64.20 |
| 13 | ∞ | 0.5000 | | |
| 14 | ∞ | 0.5000 | 1.516798 | 64.20 |
| 15 | ∞ | Bf | | |
| Image plane | ∞ | | | |

[Aspherical data]

Surface 2

$\kappa = -1.7804$, $A4 = 9.95279E-04$, $A6 = 1.67637E-05$, $A8 = -3.26588E-07$, $A10 = 0.00000E+00$ Surface 3

$\kappa = 1.0000$, $A4 = -9.48359E-04$, $A6 = 3.69879E-05$, $A8 = -5.67545E-07$, $A10 = 0.00000E+00$ Surface 4

$\kappa = 1.0000$, $A4 = -7.60047E-04$, $A6 = 2.66966E-05$, $A8 = -4.52646E-07$, $A10 = 0.00000E+00$ Surface 7

$\kappa = 1.0000$, $A4 = 2.22370E-04$, $A6 = -2.88795E-05$, $A8 = 9.93492E-07$, $A10 = 0.00000E+00$ Surface 11

$\kappa = 1.0000$, $A4 = 1.62484E-03$, $A6 = 8.49756E-05$, $A8 = 4.38122E-06$, $A10 = 0.00000E+00$

[General Data]
Zoom ratio 5.65047

| | Wide-angle end | Intermediate position | Telephoto end |
|---|---|---|---|
| f (focal length of zoom lens) | 4.76654 | 11.40000 | 26.93318 |
| FNo (F number) | 3.65000 | 5.14000 | 7.19000 |
| ω (half angle of view) | 42.78751 | 20.06684 | 8.56251 |
| Y (image height) | 3.65000 | 4.05000 | 4.05000 |
| TL (total lens length) | 44.30004 | 34.75418 | 42.56443 |
| Bf | 0.60004 | 0.60002 | 0.59998 |
| Bf (air conversion) | 1.56814 | 1.56811 | 1.56797 |

[Variable Distance Data]

| | Wide-angle end | Intermediate position | Telephoto end |
|---|---|---|---|
| D4 | 22.92645 | 7.27534 | 0.78927 |
| D11 | 9.67658 | 15.78185 | 30.07831 |

[Lens Group Data]

| Group number | First surface of group | Group focal length | Lens configuration length |
|---|---|---|---|
| G1 | 1 | −11.80252 | 4.69 |
| G2 | 6 | 10.86272 | 5.20 |

[Conditional Expressions]

Conditional expression (1) ft/Gf2 = 2.47941
Conditional expression (2) N1AV = 1.88710
Conditional expression (3) N2AV = 1.67593
Conditional expression (4) fw/Gf2 = 0.43880

As Table 3 shows, the zoom lens ZL3 according to this example satisfies the conditional expressions (1) to (4).

Figure 6B:
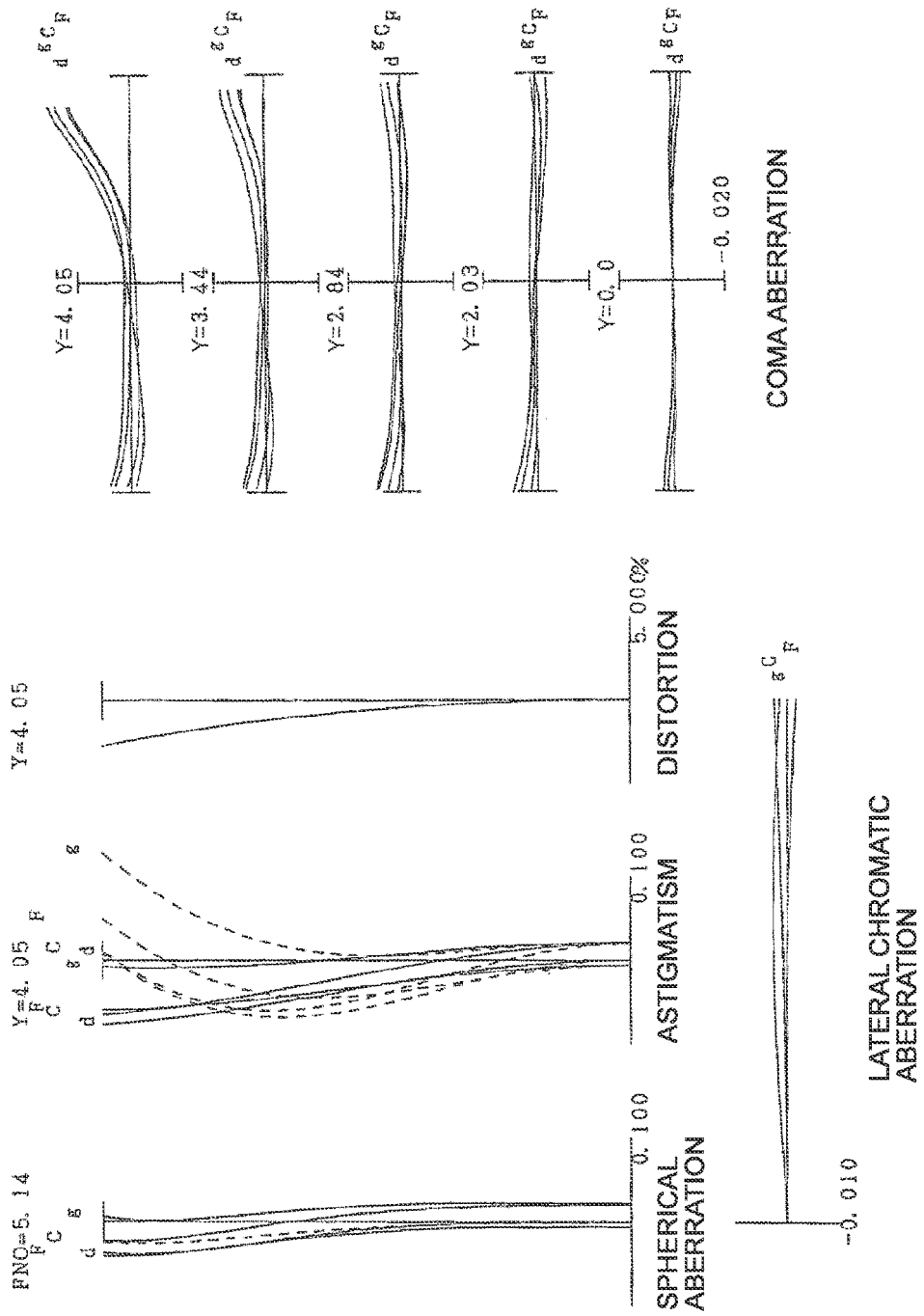

FIGS. 6A to 6C show graphs of various aberrations (spherical aberration, astigmatism, distortion, coma aberration and lateral chromatic aberration) of the zoom lens ZL3 according to Example 3, where FIG. 6A shows graphs of various aberrations upon focusing on infinity in the wide-angle end state, FIG. 6B shows graphs of various aberrations upon focusing on infinity in the intermediate focal length state, and FIG. 6C shows graphs of various aberrations upon focusing on infinity in the telephoto end state.

As each graph showing aberrations clarifies, the zoom lens according to Example 3 has an excellent optical performance, where various aberrations are corrected well in each focal length state from the wide-angle end state to the telephoto end state.

Example 4

Example 4 will be described with reference to FIG. 7, FIGS. 8A to 8C and Table 4. As FIG. 7 shows, a zoom lens ZL (ZL4) according to Example 4 is constituted by, in order from the object, a first lens group G1 having negative refractive power, and a second lens group G2 having positive refractive power.

The first lens group G1 is constituted by, in order from the object, a negative meniscus lens L11 having a convex surface facing the object, and a positive meniscus lens L12 having a convex surface facing the object. The image side lens surface of the negative meniscus lens L11, and the object side and the image side lens surfaces of the positive meniscus lens L12 are aspherical.

The second lens group G2 is constituted by, in order from the object, a biconvex positive lens L21, a biconcave negative lens L22, and a biconvex positive lens L23. The image side lens surface of the biconvex positive lens L21 and the image side lens surface of the biconvex positive lens L23 are aspherical.

An aperture stop S is disposed between the first lens group G1 and the second lens group G2, in order to adjust the quantity of light. A filter group FL constituted by a low pass filter, an infrared cut-off filter and the like is disposed between the second lens group G2 and the image plane I, in order to cut off a spatial frequency exceeding the critical resolution of the solid-state image sensor, such as a CCD, disposed on the image plane I.

In this example having the above mentioned configuration, the first lens group G1 moves toward the image plane first, then moves toward the object upon zooming from the wide-angle end state to the telephoto end state. At this time, the second lens group G2 moves toward the object. The aperture stop S moves together with the second lens group G2 toward the object.

Table 4 below shows each data of Example 4. The surface numbers 1 to 15 in Table 4 correspond to each optical surface of radius of curvatures R1 to R15 in FIG. 7. In Example 4, Surface 2, Surface 3, Surface 4, Surface 7 and Surface 11 are aspherical.

TABLE 4

[Lens Data]

| Surface number | R | D | nd | vd |
|---|---|---|---|---|
| Object plane | ∞ | | | |
| 1 | 85.4196 | 0.8000 | 1.851348 | 40.10 |
| *2(aspherical) | 5.7168 | 2.0000 | | |
| *3(aspherical) | 8.9419 | 2.0907 | 1.922860 | 20.88 |
| *4(aspherical) | 15.0000 | D4(variable) | | |
| 5(stop S) | ∞ | 0.0000 | | |
| 6 | 5.2495 | 1.8000 | 1.592014 | 67.02 |
| *7(aspherical) | −52.1130 | 0.9433 | | |
| 8 | −25.9660 | 0.8000 | 1.846660 | 23.78 |
| 9 | 27.6719 | 0.6733 | | |
| 10 | 448.9674 | 1.0669 | 1.592014 | 67.02 |
| *11(aspherical) | −22.1335 | D11(variable) | | |
| 12 | ∞ | 0.2100 | 1.516798 | 64.20 |
| 13 | ∞ | 0.5000 | | |
| 14 | ∞ | 0.5000 | 1.516798 | 64.20 |
| 15 | ∞ | Bf | | |
| Image plane | ∞ | | | |

[Aspherical data]

Surface 2

$\kappa = -1.5497$, $A4 = 8.26548E-04$, $A6 = 2.79618E-05$, $A8 = -5.04701E-07$, $A10 = 0.00000E+00$ Surface 3

$\kappa = 1.0000$, $A4 = -1.00377E-03$, $A6 = 4.04075E-05$, $A8 = -3.82305E-07$, $A10 = 0.00000E+00$ Surface 4

$\kappa = 1.0000$, $A4 = -8.58577E-04$, $A6 = 3.12933E-05$, $A8 = -2.35142E-07$, $A10 = 0.00000E+00$ Surface 7

$\kappa = 1.0000$, $A4 = 3.32723E-04$, $A6 = -3.36294E-05$, $A8 = 1.06577E-06$, $A10 = 0.00000E+00$ Surface 11

$\kappa = 1.0000$, $A4 = 1.54400E-03$, $A6 = 8.85909E-05$, $A8 = 3.78523E-06$, $A10 = 0.00000E+00$

[General Data]
Zoom ratio 5.65047

| | Wide-angle end | Intermediate position | Telephoto end |
|---|---|---|---|
| f (focal length of zoom lens) | 4.60440 | 11.60000 | 26.01710 |
| FNo (F number) | 3.58080 | 5.16023 | 6.98670 |
| ω (half angle of view) | 43.82629 | 19.68514 | 8.85620 |
| Y (image height) | 3.65000 | 4.05000 | 4.05000 |
| TL (total lens length) | 44.30000 | 34.36695 | 41.63927 |

TABLE 4-continued

[Lens Data]

| | | | |
|---|---|---|---|
| Bf | 0.80000 | 0.80000 | 0.80001 |
| Bf (air conversion) | 1.76809 | 1.76810 | 1.76810 |

[Variable Distance Data]

| | Wide-angle end | Intermediate position | Telephoto end |
|---|---|---|---|
| D4 | 23.10909 | 6.75257 | 0.78692 |
| D11 | 9.00676 | 15.43022 | 28.66819 |

[Lens Group Data]

| Group number | First surface of group | Group focal length | Lens configuration length |
|---|---|---|---|
| G1 | 1 | −11.66209 | 4.89 |
| G2 | 6 | 10.70830 | 5.28 |

[Conditional Expressions]

Conditional expression (1) ft/Gf2 = 2.42962
Conditional expression (2) N1AV = 1.88710
Conditional expression (3) N2AV = 1.67593
Conditional expression (4) fw/Gf2 = 0.42998

As Table 4 shows, the zoom lens ZL4 according to this example satisfies the conditional expressions (1) to (4).

Figure 8C:
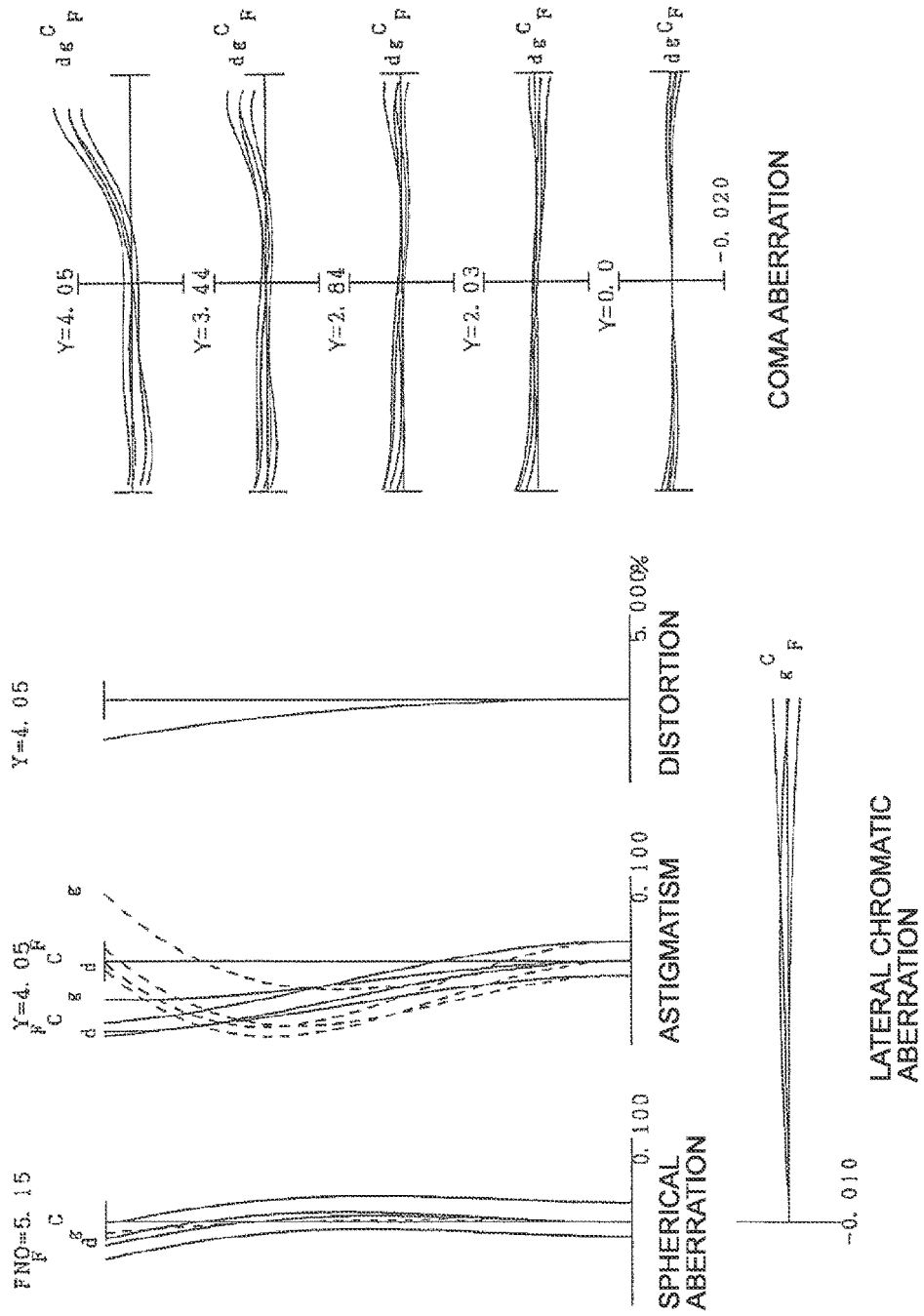

FIGS. 8A to 8C show graphs of various aberrations (spherical aberration, astigmatism, distortion, coma aberration and lateral chromatic aberration) of the zoom lens ZL4 according to Example 4, where FIG. 8A shows graphs of various aberrations upon focusing on infinity in the wide-angle end state, FIG. 8B shows graphs of various aberrations upon focusing on infinity in the intermediate focal length state, and FIG. 8C shows graphs of various aberrations upon focusing on infinity in the telephoto end state.

As each graph showing aberrations clarifies, the zoom lens according to Example 4 has an excellent optical performance, where various aberrations are corrected well in each focal length state from the wide-angle end state to the telephoto end state.

According to each example, a zoom lens which is suitable for video cameras, electronic still cameras and the like using solid-state image sensors or the like, and has a high zoom ratio, a wide angle of view, compactness and ultra high image quality, can be implemented.

In the above embodiments, the following content can be adopted within a range where the optical performance is not diminished.

In each example, the zoom lens constituted by two lens groups was shown, but the present invention can also be applied to a configuration using a different number of lens groups, such as three lens groups or four lens groups. A lens group or a lens group may be added to the configuration on the side closest to the object, or a lens or a lens group may be added to the configuration on the side closest to the image. "Lens group" refers to a portion having at least one lens isolated by an air space which changes upon zooming.

In the zoom lens ZL of each embodiment, a single or a plurality of lens group(s) or a partial lens group may be designed to be a focusing lens group, which performs focusing from an object at infinity to an object at a short distance by moving in the optical axis direction. This focusing lens group can be applied to auto focus, and is also suitable for driving a motor for auto focusing (driving using an ultrasonic motor or the like). It is particularly preferable that at least part of the first lens group G1 is designed to be the focusing lens group.

In the zoom lens ZL of each embodiment, a lens group or a partial lens group may be designed to be a vibration-isolating lens group, which corrects image blurs generated by camera shake, by vibrating the lens group or the partial lens group in a direction perpendicular to the optical axis or rotating (oscillating) the lens group or the partial lens group in an in-plane direction that includes the optical axis. It is particularly preferable that at least a part of the second lens group G2 is designed to be the vibration-isolating lens group.

In the zoom lens ZL of each embodiment, the lens surface may be formed to be a spherical surface or a plane, or an aspherical surface. If the lens surface is a spherical surface or a plane, lens processing, assembly and adjustment are easy, and deterioration of optical performance, due to an error generated in processing, assembly and adjustment, can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

In the zoom lens ZL of each embodiment, it is preferable that the aperture stop S is disposed in or near the second lens group G2, but the role of the aperture stop may be substituted by the frame of the lens, without disposing a separate member as the aperture stop.

In the zoom lens ZL of each embodiment, each lens surface may be coated with an anti-reflection film, which has high transmittance in a wide wavelength region in order to decrease flares and ghosts, and implement high optical performance with high contrast.

The zoom ratio of the zoom lens ZL of this embodiment is about 3 to 10.

The present invention has been described with configuration requirements of each embodiment to assist in understanding the invention, but needless to say the present invention is not limited to this description.

EXPLANATION OF NUMERALS AND CHARACTERS

ZL (ZL1 to ZL4) zoom lens
G1 first lens group
G2 second lens group
FL filter group
I image plane
CAM digital still camera (optical apparatus)

The invention claimed is:

1. A zoom lens comprising, in order from an object:
a first lens group having negative refractive power; and
a second lens group having positive refractive power, and
the following conditional expressions are satisfied:

$$1.90 < ft/Gf2 < 3.50$$

$$1.85 < N1AV$$

$$0.10 < fw/Gf2 < 0.55$$

where ft denotes a focal length of the zoom lens in a telephoto end state, and Gf2 denotes a focal length of the second lens group,
where N1AV denotes an average value of refractive indexes at d-line of optical materials of lenses constituting the first lens group, and
fw denotes a focal length of the zoom lens in a wide-angle end state.

2. The zoom lens according to claim 1, wherein the following conditional expression is satisfied:

$$1.50 < N2AV < 1.80$$

where N2AV denotes an average value of refractive indexes at d-line of optical materials of lenses constituting the second lens group.

3. The zoom lens according to claim 1, wherein the first lens group is constituted only by, in order from the object, a negative lens and a positive lens.

4. The zoom lens according to claim 1, wherein the second lens group is constituted by at least one positive lens and at least one negative lens.

5. The zoom lens according to claim 1, wherein the second lens group is constituted only by, in order from the object, a positive lens, a negative lens and a positive lens.

6. The zoom lens according to claim 1, wherein respective lenses constituting the second lens group are disposed via air.

7. The zoom lens according to claim 1, wherein the distance between the first lens group and the second lens group changes upon zooming from a wide-angle end state to the telephoto end state.

8. The zoom lens according to claim 1, wherein upon zooming from a wide-angle end state to the telephoto end state, the first lens group moves along a path having convex curve toward the image, and the second lens group moves toward the object.

9. An optical apparatus, comprising the zoom lens according to claim 1.

10. A zoom lens comprising, in order from an object:
a first lens group having negative refractive power; and
a second lens group having positive refractive power, and
the following conditional expressions are satisfied:

$$0.10 < fw/Gf2 < 0.55$$

$$1.50 < N2AV < 1.75$$

$$1.85 < N1AV$$

where fw denotes a focal length of the zoom lens in a wide-angle end state, and Gf2 denotes a focal length of the second lens group,
where N2AV denotes an average value of refractive indexes at d-line of optical materials of lenses constituting the second lens group, and
where N1AV denotes an average value of refractive indexes at d-line of optical materials of lenses constituting the first lens group.

11. An optical apparatus, comprising the zoom lens according to claim 10.

12. A manufacturing method for a zoom lens including, in order from an object, a first lens group having negative refractive power, and a second lens group having positive refractive power,
the method comprising:
assembling each lens in a lens barrel so that the following conditional expressions are satisfied:

$$1.90 < ft/Gf2 < 3.50$$

$$1.85 < N1AV$$

$$0.10 < fw/Gf2 < 0.55$$

where ft denotes a focal length of the zoom lens in a telephoto end state, and Gf2 denotes a focal length of the second lens group,
where N1AV denotes an average value of refractive indexes at d-line of optical materials of lenses constituting the first lens group, and
where fw denotes a focal length of the zoom lens in a wide-angle end state.

13. The manufacturing method for a zoom lens according to claim 12, wherein the following conditional expression is satisfied:

$$1.50 < N2AV < 1.80$$

where N2AV denotes an average value of refractive indexes at d-line of optical materials of lenses constituting the second lens group.

14. A manufacturing method for a zoom lens including, in order from an object, a first lens group having negative refractive power, and a second lens group having positive refractive power,
the method comprising:
assembling each lens in a lens barrel so that the following conditional expressions are satisfied:

$$0.10 < fw/Gf2 < 0.55$$

$$1.50 < N2AV < 1.75$$

$$1.85 < N1AV$$

where fw denotes a focal length of the zoom lens in a wide-angle end state, and Gf2 denotes a focal length of the second lens group,
where N2AV denotes an average value of refractive indexes at d-line of optical materials of lenses constituting the second lens group, and where N1AV denotes an average value of refractive indexes at d-line of optical materials of lenses constituting the first lens group.

15. A zoom lens consisting of, in order from an object:
a first lens group having negative refractive power; and
a second lens group having positive refractive power, and
the following conditional expressions are satisfied:

$$2.00 < ft/Gf2 < 3.50$$

where ft denotes a focal length of the zoom lens in a telephoto end state, and Gf2 denotes a focal length of the second lens group.

16. The zoom lens according to claim 15, wherein the following conditional expressions are satisfied:

$$2.10 < ft/Gf2 < 3.50$$

$$1.85 < N1AV$$

where ft denotes a focal length of the zoom lens in a telephoto end state, and Gf2 denotes a focal length of the second lens group, and
where N1AV denotes an average value of refractive indexes at d-line of optical materials of lenses constituting the first lens group.

17. A zoom lens consisting of, in order from an object:
a first lens group having negative refractive power; and
a second lens group having positive refractive power, and
the following conditional expressions are satisfied:

$$0.10 < fw/Gf2 < 0.55$$

$$1.85 < N1AV$$

where fw denotes a focal length of the zoom lens in a wide-angle end state, and Gf2 denotes a focal length of the second lens group, and
where N1AV denotes an average value of refractive indexes at d-line of optical materials of lenses constituting the first lens group.

18. The zoom lens according to claim 17, wherein the following conditional expressions are satisfied:

$$1.88 < N1AV$$

$$1.50 < N2AV \leq 1.67593$$

where N1AV denotes an average value of refractive indexes at d-line of optical materials of lenses constituting the first lens group, and
where N2AV denotes an average value of refractive indexes at d-line of optical materials of lenses constituting the second lens group.

19. A manufacturing method for a zoom lens consisting of, in order from an object, a first lens group having negative refractive power, and a second lens group having positive refractive power,
the method comprising:
assembling each lens in a lens barrel so that the following conditional expressions are satisfied:

$$2.00 < ft/Gf2 < 3.50$$

where ft denotes a focal length of the zoom lens in a telephoto end state, and Gf2 denotes a focal length of the second lens group.

20. A manufacturing method for a zoom lens consisting of, in order from an object, a first lens group having negative refractive power, and a second lens group having positive refractive power,
the method comprising:
assembling each lens in a lens barrel so that the following conditional expressions are satisfied:

$$0.10 < fw/Gf2 < 0.55$$

$$1.85 < N1AV$$

where fw denotes a focal length of the zoom lens in a wide-angle end state, and Gf2 denotes a focal length of the second lens group, and
where N1AV denotes an average value of refractive indexes at d-line of optical materials of lenses constituting the first lens group.

* * * * *